(12) United States Patent
Yamauchi et al.

(10) Patent No.: US 6,605,898 B2
(45) Date of Patent: Aug. 12, 2003

(54) CRT DEVICE WITH IMPROVED RESOLUTION

(75) Inventors: Masahide Yamauchi, Kyoto (JP); Kazunori Ohta, Takatsuki (JP); Masahiko Sukeno, Ahiya (JP); Takashi Itoh, Amagasaki (JP)

(73) Assignee: Matsushita Electric Industrial Co., Ltd, Osaka-Fu (JP)

( * ) Notice: Subject to any disclaimer, the term of this patent is extended or adjusted under 35 U.S.C. 154(b) by 0 days.

(21) Appl. No.: 10/047,557

(22) Filed: Jan. 15, 2002

(65) Prior Publication Data

US 2002/0093586 A1 Jul. 18, 2002

(30) Foreign Application Priority Data

Jan. 16, 2001 (JP) ........................................ 2001-007365

(51) Int. Cl.[7] ................................................. H01J 29/96
(52) U.S. Cl. .................... 315/3; 315/382.1; 348/806
(58) Field of Search .......................... 315/3, 382.1, 1, 315/370, 382, 14, 15; 313/414; 348/806

(56) References Cited

U.S. PATENT DOCUMENTS

| | | | | |
|---|---|---|---|---|
| 4,481,445 A | * | 11/1984 | Gorski | 315/14 |
| 4,914,724 A | * | 4/1990 | Chevalier et al. | 315/382 |
| 5,610,481 A | * | 3/1997 | Shirai et al. | 315/382 |
| 5,689,158 A | * | 11/1997 | Chen | 315/382.1 |
| 5,710,481 A | | 1/1998 | Park et al. | 313/414 |
| 5,872,432 A | * | 2/1999 | Beeteson | 315/382.1 |
| 5,936,338 A | * | 8/1999 | Takahashi | 313/414 |
| 6,462,487 B1 | * | 10/2002 | Lefort et al. | 315/382 |

FOREIGN PATENT DOCUMENTS

| | | |
|---|---|---|
| JP | 5287351 | 7/1977 |
| JP | 785812 | 3/1995 |
| JP | 9312139 | 12/1997 |

* cited by examiner

*Primary Examiner*—Don Wong
*Assistant Examiner*—Ephrem Alemu

(57) ABSTRACT

A CRT device with an electron gun provided therein includes control means for controlling voltages applied to a cathode and a control electrode constituting the electron gun. The control means exerts control on each electrode voltage so that the difference between the cutoff voltage of the cathode and the voltage of the control electrode is greater when the luminance level of a luminance signal separated from picture signal is higher, thereby minimizing a spot diameter.

18 Claims, 25 Drawing Sheets

PRIOR ART

Fig.8

| Item No | Luminance Sig | Control Sig | Control Sig. (R) | Control Sig. (G) | Control Sig. (B) |
|---|---|---|---|---|---|
| 1 | ●●● | | ▲▲▲<br>▲▲▲<br>▲▲▲ | ◆◆◆<br>◆◆◆<br>◆◆◆ | ■■■<br>■■■<br>■■■ |
| 2 | ●●●<br>●●●<br>●●● | | ▲▲▲<br>▲▲▲<br>▲▲▲ | ◆◆◆<br>◆◆◆<br>◆◆◆ | ■■■<br>■■■<br>■■■ |
| 3 | ●●●<br>●●●<br>●●● | | ▲▲▲<br>▲▲▲<br>▲▲▲ | ◆◆◆<br>◆◆◆<br>◆◆◆ | ■■■<br>■■■<br>■■■ |
| ··· | ··· | | ··· | ··· | ··· |
| 256 | ●●●<br>●●●<br>●●● | | ▲▲▲<br>▲▲▲<br>▲▲▲ | ◆◆◆<br>◆◆◆<br>◆◆◆ | ■■■<br>■■■<br>■■■ |

3021

CRT DEVICE WITH IMPROVED RESOLUTION

BACKGROUND OF THE INVENTION (1) Field of the Invention

The present invention relates to a Cathode-Ray Tube (CRT) device used, for example, in a computer and a television set, and in particular to a technique to improve the resolution.

(2) Description of the Related Art

A CRT device used in a computer monitor and a television set emits an electron beam from an electron gun onto a phosphor screen where the phosphor emits light to display an image. Resulting resolution is higher when a spot of the electron beam (hereinafter referred to as a "spot diameter") causing the light emission of the phosphor screen is smaller.

FIG. 1 is a vertical sectional view schematically showing the construction of a typical electron gun. In FIG. 1, an electron gun 1 is constructed of a cathode 10, a control electrode 11, an accelerating electrode 12, a focusing electrode 13, and a final accelerating electrode 14. Electrons emitted from the cathode 10 are accelerated by the accelerating electrode 12 toward a phosphor screen 15. The focusing electrode 13 and the final accelerating electrode 14 together generate an electrostatic lens (hereinafter, referred to as a "main lens") 16 to bring the focus of the electron beam onto the phosphor screen 15.

Generally, the spot diameter varies in relation to the diameter of the electron beam within the main lens (hereinafter, referred to as the "beam diameter"). Such a beam diameter that results in the smallest spot diameter is referred to as an optimum beam diameter. The optimum beam diameter differs depending on a luminance signal, that is a current flowing through the cathode (hereinafter, referred to as a "beam current") Ia.

Here, it is known that if an electron gun is designed to be optimum in the beam diameter when the beam current Ia is large i.e. when the luminance is high, such an electron gun does not results in the optimum beam diameter when the beam current Ia is smaller. Conversely, however, if an electron gun is designed to be optimum in the beam diameter when the beam current Ia is smaller, the resulting beam diameter falls short of optimum when the beam current is larger.

To address the above problems, conventional electron guns are designed to be optimum in the beam diameter when the beam current is large in view of the fact that when the beam current Ia is larger, the beam diameter generally tends to be larger. With such a construction, however, the beam diameter still falls short of optimum when the beam current is small, which means that when the luminance of an image is low, the resolution becomes low. As a result, for example, a dim and fine pattern may not be displayed in detail.

Another conventional electron gun disclosed in Japanese Patent Unexamined Publication No. HEI 7(1995)-085812 is provided with an auxiliary electrode arranged between the accelerating electrode and the focusing electrode. The auxiliary electrode is applied with a voltage that has been adjusted according to a luminance signal so as to vary the strength (converging action) of pre-focusing lens. As a result, the beam diameter is controlled in a manner to minimize the spot diameter.

To meet this end, however, a high voltage ranging from hundreds to thousands volts needs to be applied to the auxiliary electrode. Consequently, in order to vary the strength of pre-focusing lens in a manner of allowing an image within which the luminance greatly and frequently differs to be displayed in high resolution, the electron gun is required to have an amplifier circuit capable of varying such a high voltage with high speed (several MHz to tens of MHz), which is not practical at all.

SUMMARY OF THE INVENTION

The present invention is made in view of the above problems, and with an object of providing a CRT device for displaying an image in high resolution irrespective of the luminance.

To achieve the above object, a CRT device of the present invention comprises: an electron gun including a cathode and a control electrode; and spot diameter control means for controlling a spot diameter by varying a difference between a cutoff voltage of the cathode and a voltage applied to the control electrode in accordance with a luminance signal. With this construction, the strength of cathode lens is varied by controlling the difference between the cutoff voltage of the cathode and the voltage of the control electrode in accordance with the luminance. As the strength of cathode lens is varied, the point of crossover shifts, which in the end controls the spot diameter, thereby improving the resolution of the CRT device.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 8 is a view showing the construction of a table correlating the luminance signals and the control signals;

DESCRIPTION OF THE PREFERRED EMBODIMENT

Now, description is given to preferred embodiments of the present invention with reference to the drawings.

[1] First Preferred Embodiment

Figure 1:
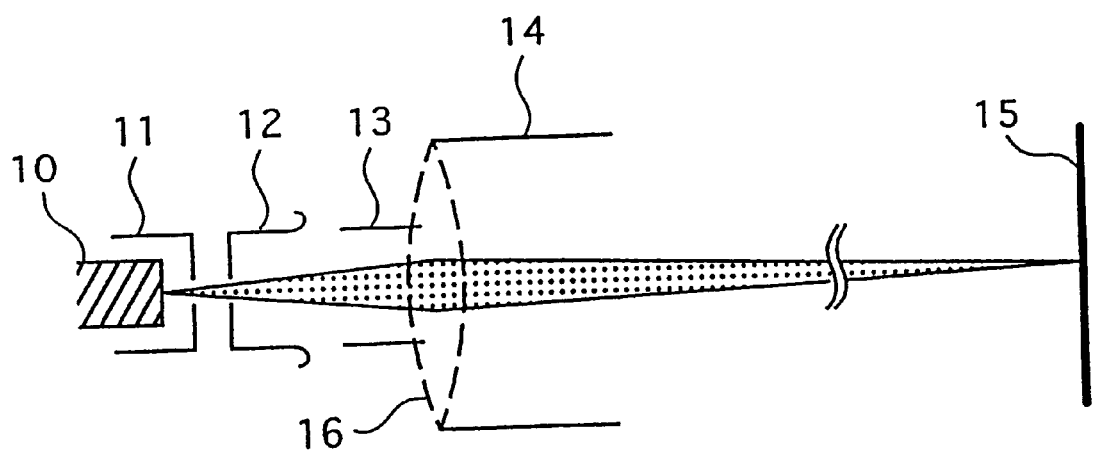
FIG. 1 is a vertical sectional view schematically showing the construction of a typical electron gun according to prior art.
Figure 2:
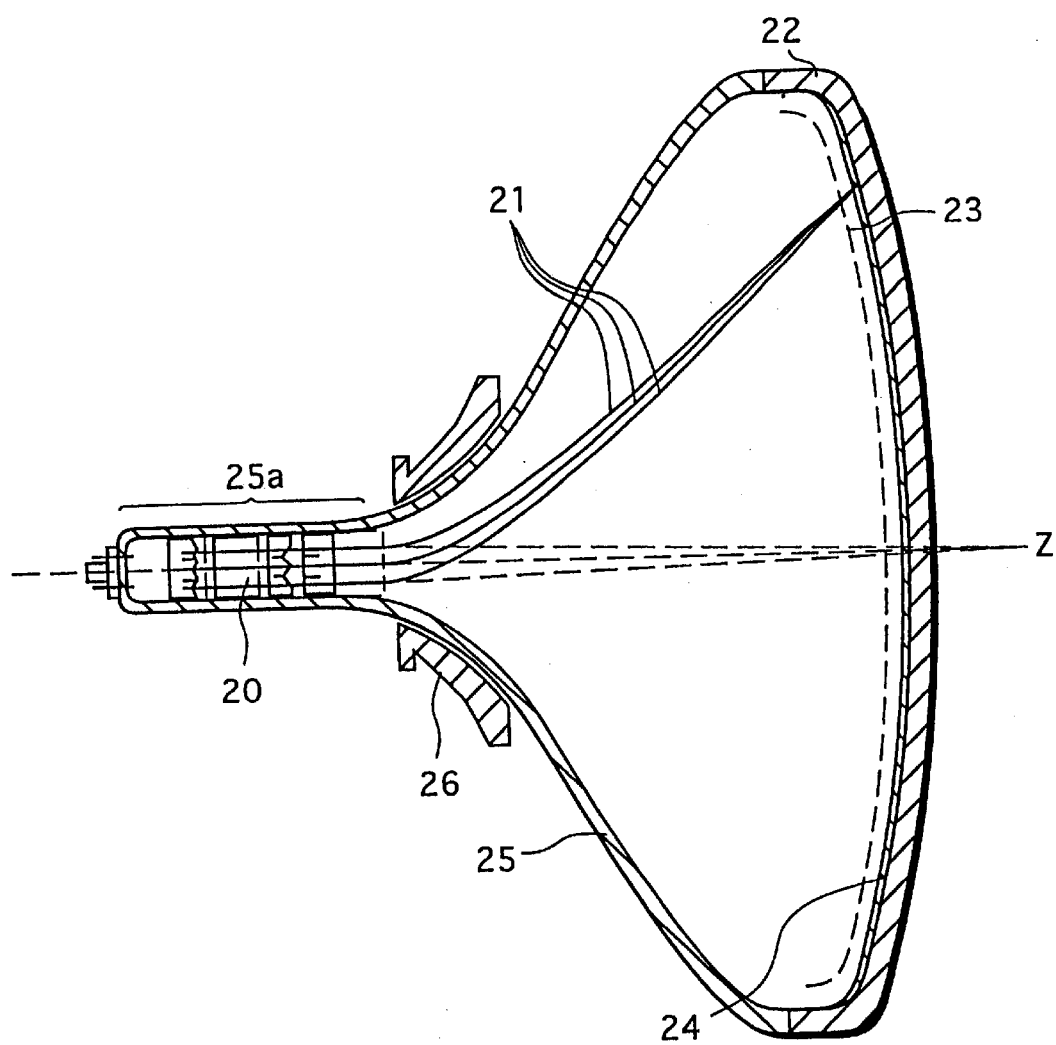
FIG. 2 is a view showing a CRT device according to the first embodiment vertically sectioned along the axis Z of the tube.

FIG. 2 is a view showing a CRT device according to a first embodiment vertically sectioned along an axis Z of the tube. In FIG. 2, a CRT device 2 is constructed of a glass bulb that is made of a front panel 22 and a funnel 25 jointed together. Inside a neck part 25a of the funnel 25, an inline type electron gun 20 is disposed. Here, the screen size is 76 cm and the deflection angle is 106°.

Phosphors of each of three colors, namely red, green, and blue are applied on the inner surface of the front panel 22 to form a phosphor screen 24. An electron beam 21 emitted from the electron gun 20 is deflected by a deflection yoke 26 which is externally disposed on the funnel 25, and separated into each color by passing through a shadow mask 23, then irradiates the phosphor screen 24 to cause light emission of the phosphors.

[2] Construction of Electron Gun 20

Figure 3:
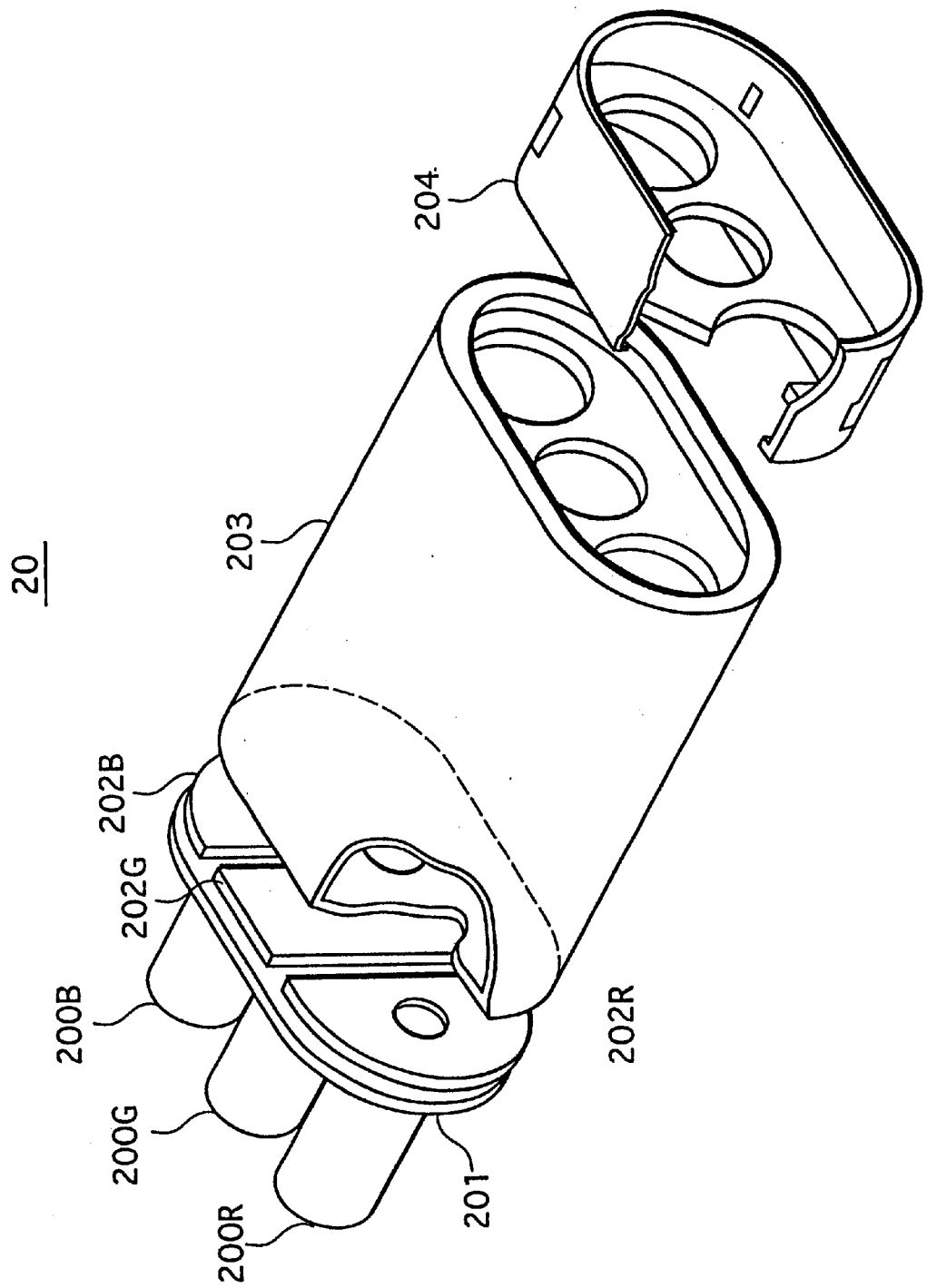
FIG. 3 is an external oblique view showing the electron gun 20 according to the first embodiment with the focusing electrode 203 and the final accelerating electrode 204 being partly broken to show other components.

FIG. 3 is an external oblique view showing the electron gun 20 according to this embodiment. In the figure, focusing electrode 203 and a final accelerating electrode 204 are partly broken to show other components. As illustrated in FIG. 3, the electron gun 20 is constructed of: cathodes 200R, 200G, and 200B corresponding to the colors RGB, respectively; a control electrode 201; accelerating electrodes 202R, 202G, and 202B corresponding to the colors RGB, respectively; the focusing electrode 203; and the final accelerating electrode 204. The cathodes 200R, 200G, and 200B are disposed in inline arrangement.

Figure 4:
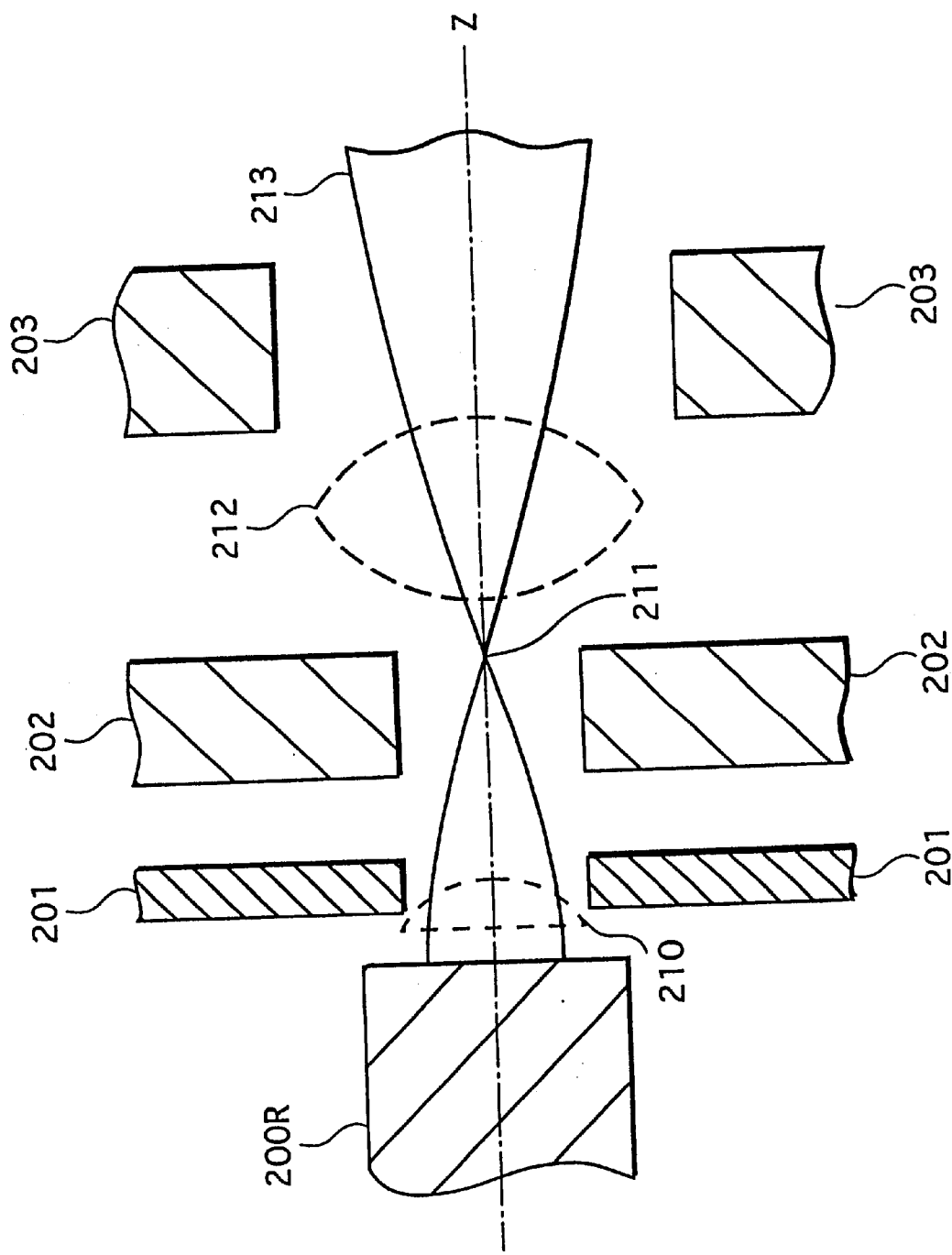
FIG. 4 is a view showing the electron gun 20 sectioned vertically along the central axis of the cathode 200R.

FIG. 4 is a view showing the electron gun 20 sectioned vertically along the central axis of the cathode 200R. It should be noted that the sectional views taken along the central axes of the cathode 200G and 200B are similar to FIG. 4, and thus description is given below referring to the figure showing the vertical cross section taken along the central axis of the cathode 200R as an exemplary figure.

Now, as shown in FIG. 4, the cathode 202R and the control electrode 201 together generate a cathode lens 210, and the accelerating electrode 202R and the focusing electrode 203 together generate a pre-focusing lens 212. In addition, although not illustrated in the figure, the focusing electrode 203 and the final accelerating electrode 204 together generate a main lens.

An electron beam 213 emitted from the cathode 200R is focused on a crossover 211 by passing though the cathode lens 210, and emitted there from with a predetermined divergence angle toward the pre-focusing lens 212. Then, having been pre-focused by the pre-focusing lens 212, the electron beam 213 is brought to focus by the main lens to produce a spot on the phosphor screen 24.

Here, the control electrode 201 is 0.06 mm in thickness and has apertures each 0.5 mm in diameter. Each of the accelerating electrodes 202R–202B is 0.55 mm in thickness and has a 0.5 mm diameter aperture. The focusing electrode 203 is 0.35 mm in thickness at the side facing the accelerating electrodes 202R–202B and has 0.9 mm diameter apertures.

The distances from the cathodes 200R–200B to the control electrode 201 are uniformly 0.07 mm. The distances from the control electrode 201 to the accelerating electrode 202R–202B are uniformly 0.22 mm. Further, the distances from the accelerating electrodes 202R–202B to the focusing electrode 203 are uniformly 0.7 mm.

Voltage applied to the control electrode 201, the focusing electrode 203, and the final accelerating electrode 204, are constant at 0V, about 6,800V, and about 32 kV, respectively. On the other hand, voltages applied to the cathodes 200R–200B and the accelerating electrodes 202R–202B are adjusted in accordance with luminance signals.

[3] Construction of Circuit for Controlling Accelerating Electrode Voltage Vg2

Figure 5:
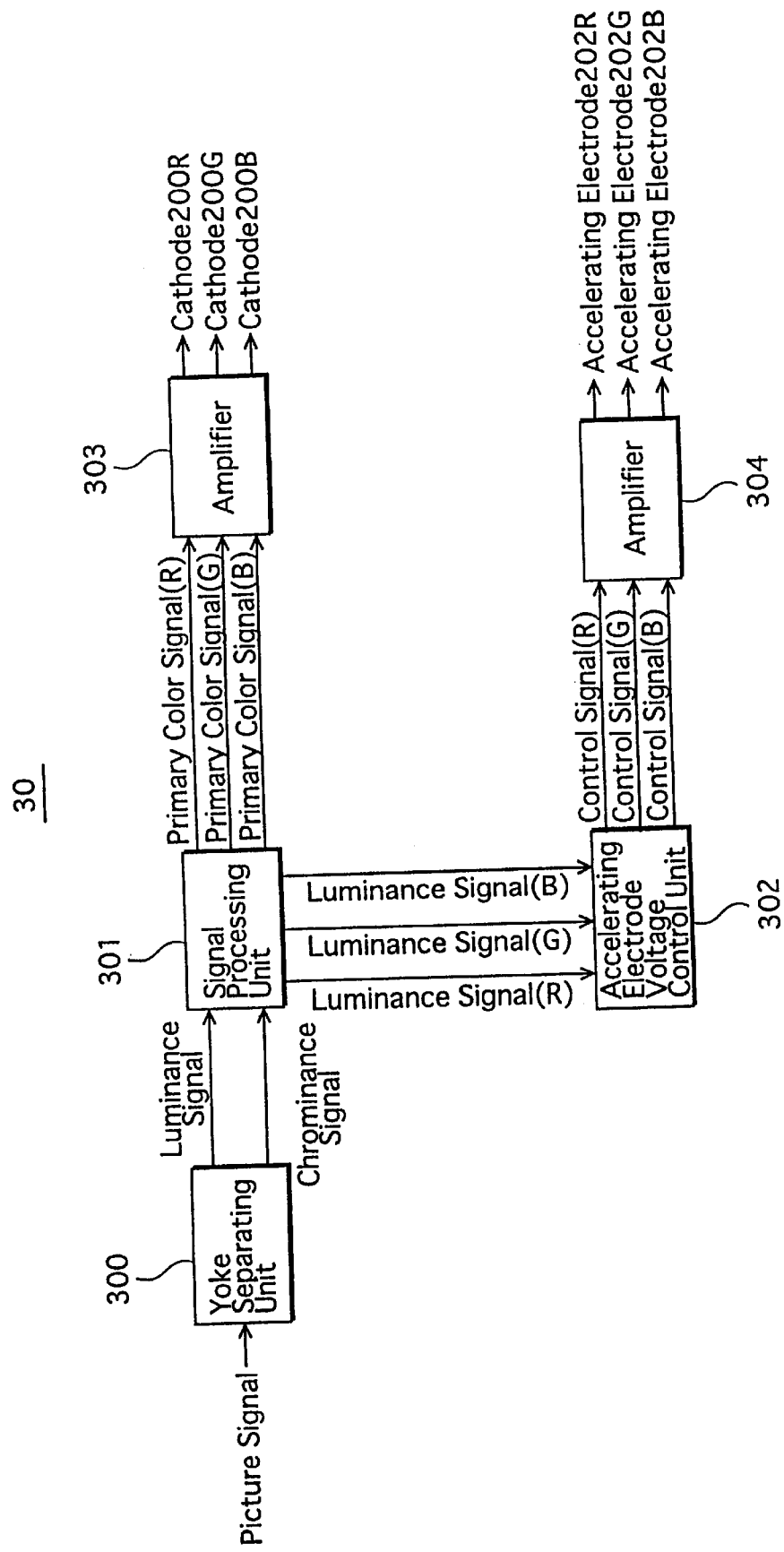
FIG. 5 is an explanatory block diagram showing the construction and function of the circuit 30 for controlling the accelerating electrode voltage Vg2.

Next, description is given to a circuit for controlling voltages to be applied to the accelerating electrodes 202R–202B described above. FIG. 5 is an explanatory block diagram showing the construction and function of a circuit for controlling the accelerating electrode voltage Vg2. In FIG. 5, a control circuit 30 is constructed of a YC separating unit 300, a signal processing unit 301, an accelerating electrode voltage control unit 302, and amplifiers 303 and 304.

When picture signals are supplied to the control circuit 30, the YC separating unit 300 separates the picture signals into luminance signals (Y) and chrominance signals (C). When the luminance signals and the chrominance signals are passed from the YC separating unit 300, the signal processing unit 301 conducts various processing such as picture quality adjustment, contrast control, retrace blanking, and the like. Thereafter, the signal processing unit 301 outputs to the amplifier 303 primary color signals (R), (G), and (B) corresponding to each of the three colors RGB, and outputs to the accelerating electrode voltage control unit 302 luminance signals (R)–(B) corresponding to each of the three colors RGB.

The accelerating electrode voltage control unit 302 receives the luminance signals (R)–(B) from the signal processing unit 301 and outputs control signals (R)–(B) to the amplifier 304 in order to control each voltage applied to the accelerating electrodes 202R–202B. The control signals (R)–(B) in the end function to minimize spot diameters corresponding to each of the three colors RGB.

The amplifier 303 receives the primary color signals (R)–(B), and amplifies the received signals to output to the corresponding cathodes 200R–200G. The amplifier 304 receives the control signals (R)–(B), and amplifies the received signals to apply voltages to the corresponding accelerating electrodes 202R–202G.

[4] Operation of Accelerating Electrode Voltage Control Unit 302

Now, description is further given in detail to the operation of accelerating electrode voltage control unit 302. The accelerating electrode voltage control unit 302 varies voltages applied to the accelerating electrodes 202R–202G in accordance with the luminance signals so as to minimize the spot diameters.

Figure 6:
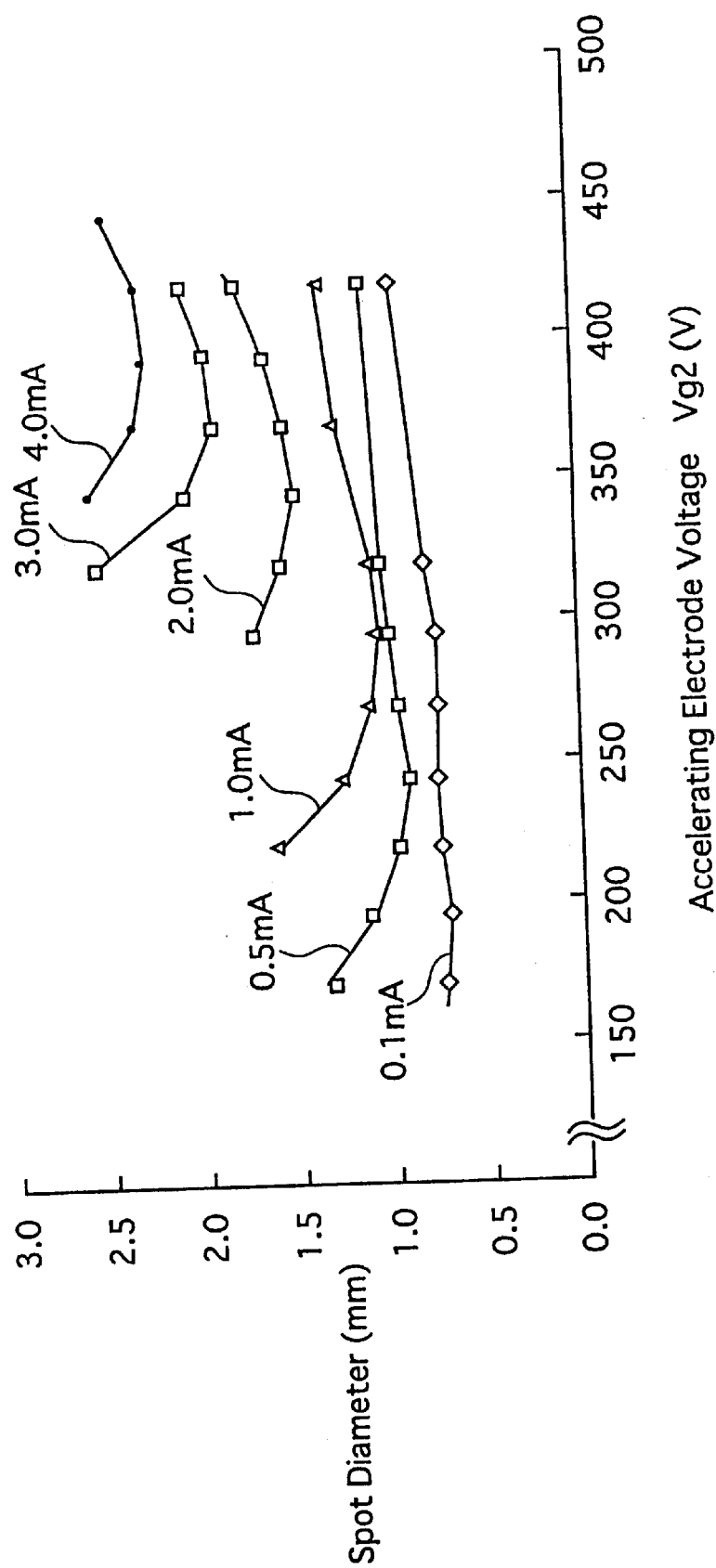
FIG. 6 is a graph showing relations between the voltages Vg2 applied to the accelerating electrode of the CRT device 2 and the resulting spot diameters with respect to various values of current flowing through the cathode or the beam current Ia.

FIG. 6 is a graph separately showing relations between the voltages Vg2 applied to the accelerating electrode of the CRT device 2 and the resulting spot diameters with various values of current flowing through the cathode or the beam current Ia. As shown in FIG. 6, the accelerating electrode voltages Vg2 and the spot diameters draw separate curves and each curve has an accelerating electrode voltage Vg2 at which the spot diameter is the smallest.

For example, when the beam current Ia is 3.0 mA, the spot diameter becomes the smallest, which is about 1.9 mm, with the accelerating electrode current Vg2 of about 370V. When the beam current Ia is about 0.5 mA, the spot diameter becomes the smallest, which is about 0.9 mm, with the accelerating electrode voltage Vg2 of about 250V. As above, the accelerating electrode voltage Vg2 that results in the smallest spot diameter is determined for each different beam current Ia by actual measurement.

It should be noted that the beam current Ia is in a proportional relation with the luminance. Higher beam current Ia results in higher luminance, while smaller beam current Ia results in lower luminance. That is to say, the accelerating electrode voltage Vg2 that results in the smallest spot diameter is determined for each beam current Ia. Consequently, the accelerating electrode control unit 302 generates control signals according to the relation between the beam current Ia and the accelerating electrode voltage Vg2.

Figure 7:
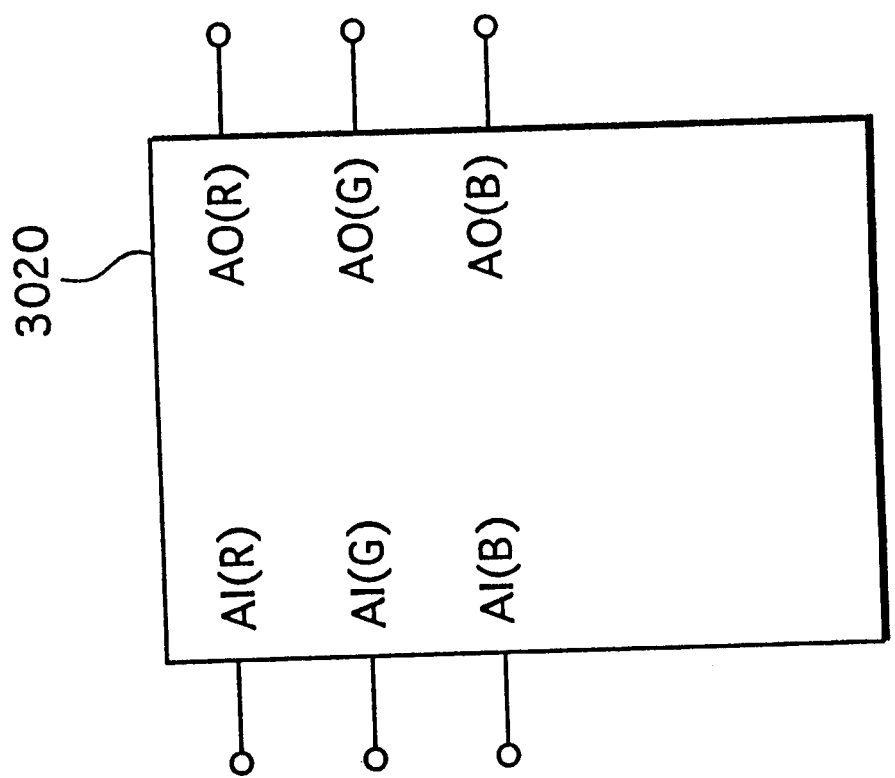
FIG. 7 is an explanatory block diagram showing the construction and function of the accelerating electrode voltage control unit 302.

FIG. 7 is a view showing the construction of the accelerating electrode voltage control unit 302. In FIG. 7, the accelerating electrode voltage control unit 302 is constructed of a single CPU 3020. In the CPU 3020, analog input terminals AI(R), AI(G), and AI(B) receive respective luminance signals corresponding to the accelerating electrodes 202R–202B. In addition, analog output terminals AO(R), AO(G), and AO(B) output respective control signals for controlling voltages applied to each of the accelerating electrodes 202R–202B.

The CPU 3020 stores a table correlating the luminance signals and the control signals in its internal ROM. FIG. 8 shows the construction of such a table. As shown in FIG. 8, a table 3021 provides luminance signals (R)–(B) in 256 voltage levels along with their corresponding voltages to be outputted as control signals (R)–(B).

Figure 9:
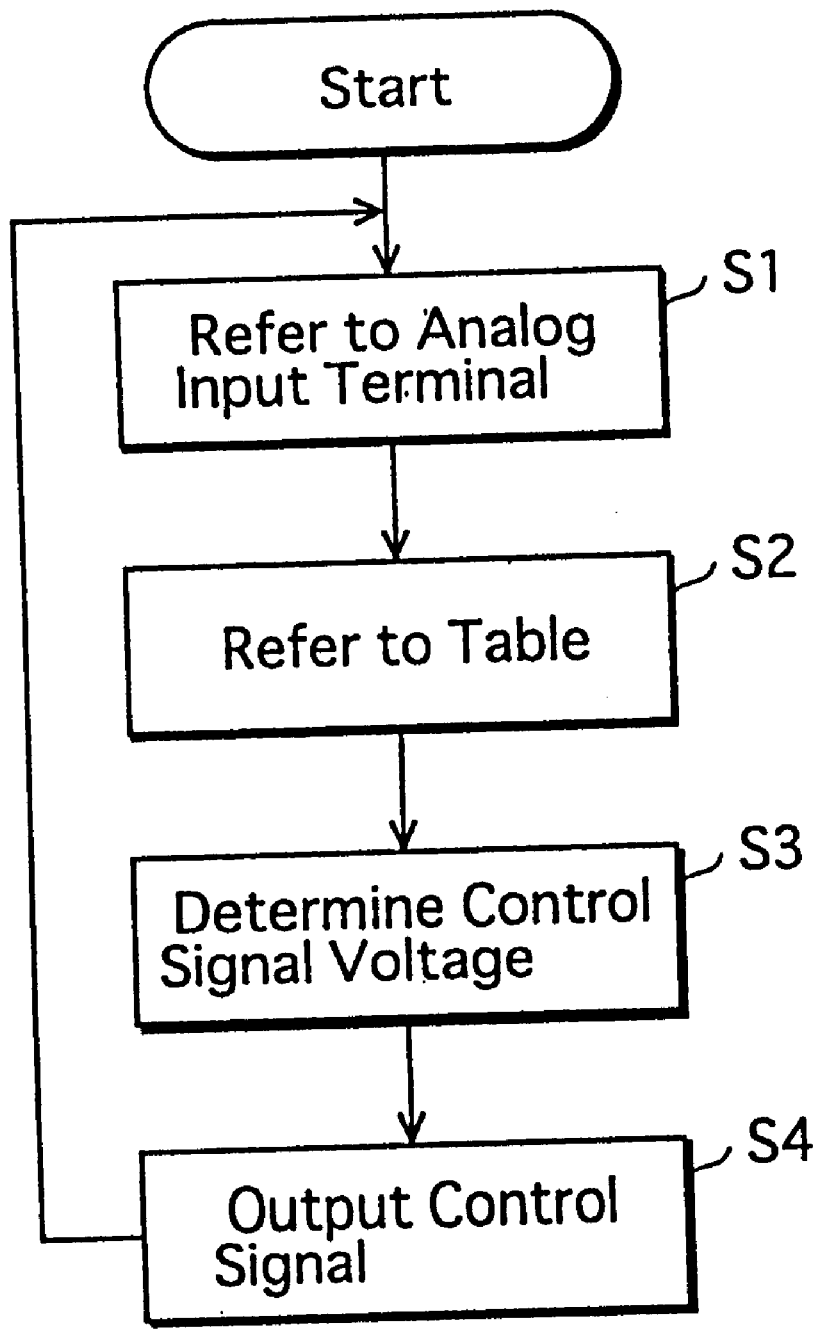
FIG. 9 is a flowchart showing the operations of the CPU 3020 included in the accelerating electrode voltage control unit 302.

FIG. 9 is a flowchart showing the operations of the CPU 3020. When receiving luminance signals with the analog input terminals AI(R), AI(G), and AI(B) (S1), the CPU 3020 makes reference to the table 3021 with the voltage of received luminance signal (S2), to determine the voltages of control signals (S3). The CPU 3020 then outputs the control signals (R)–(B) at the determined voltage from the analog signals AO(R), AO(G), and AO(B) (S4).

In the above manner, the accelerating electrode voltages Vg2 are controlled according to the luminance signals. Through this control, the strength (focusing power) of cathode lens is varied so that a crossover point is shifted back and forth, thereby optimizing the beam diameter and thus minimizing the spot diameter.

[5] Operation Characteristics of Electron Gun 20

Next, description is given to the operation characteristics of the electron gun 20, focusing on voltages applied to each electrode constituting the electron gun 20.

Figure 10:
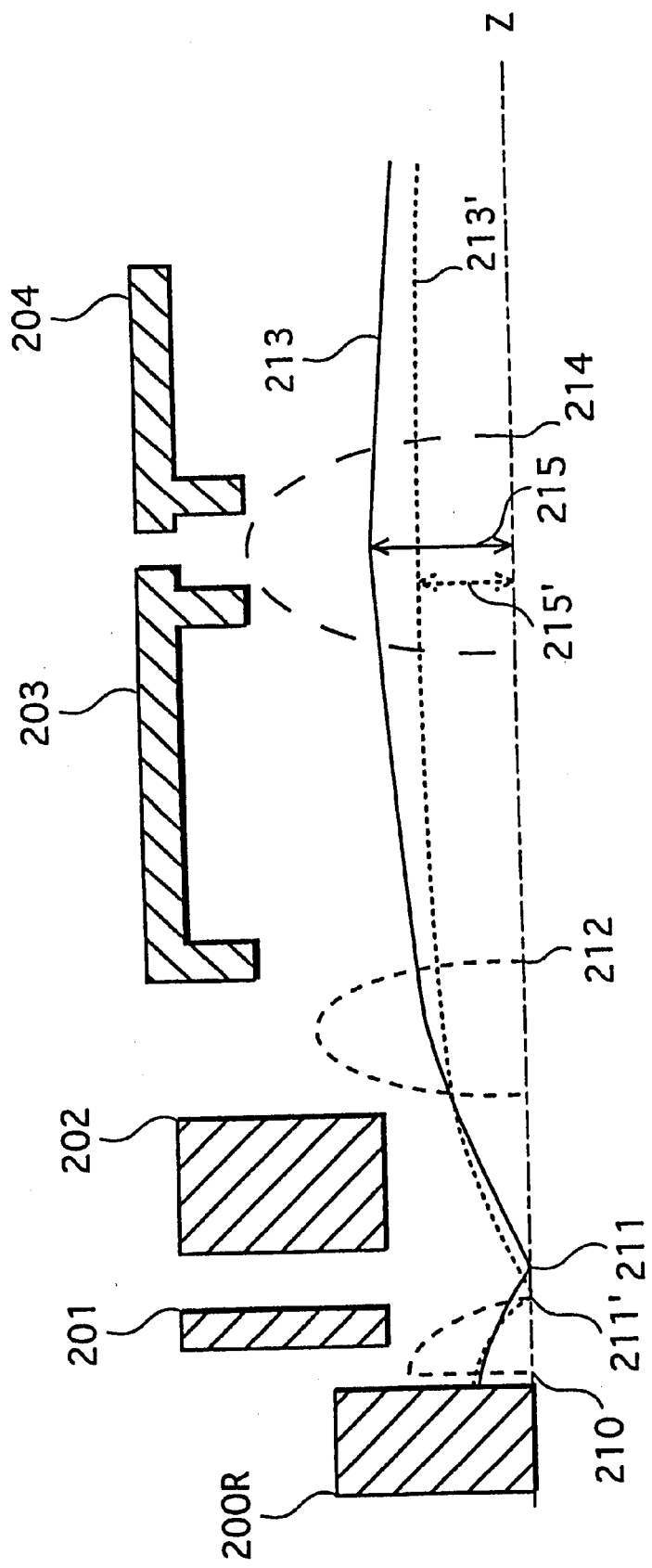
FIG. 10 is a view showing the electron gun 20 vertically sectioned along the central axis of the cathode 200R in a manner to show the entire electron gun 20 including the final accelerating electrode 204 and the main lens 214.

Similarly to FIG. 4, FIG. 10 is a view showing the electron gun 20 vertically sectioned along the central axis of one of the cathodes, in this case the cathode 200R. In this figure, the entire electron gun 20 is shown including a final accelerating electrode 204 and a main lens 214. It should be noted that vertical sectional views taken along the central axes of the cathode 200G and 200B are similar to FIG. 10, and thus description is given below to the figure showing the vertical cross section taken along the central axis of the cathode 200R as an exemplary figure.

In FIG. 10, when the accelerating electrode voltage Vg2 is raised while the luminance is kept constant, the strength of cathode lens 210 increases so as to bring the crossover point closer to the cathode 200R along the axis Z. Reversely, when the accelerating electrode voltage Vg2 is dropped while the luminance is kept constant, the strength of cathode lens 210 decreases so as to move the crossover point further away from the cathode 200R along the axis Z.

For example, when the crossover point takes place at a point 211, the electron beam 213 has a diameter 215 when passing the main lane 214. When the crossover point takes place at a point 211', the electron beam 213' has a diameter 215' when passing the main lens 214. In this manner, the CRT device 2 is capable of optimizing the beam diameter through controlling the accelerating electrode voltage Vg2.

Figure 11:
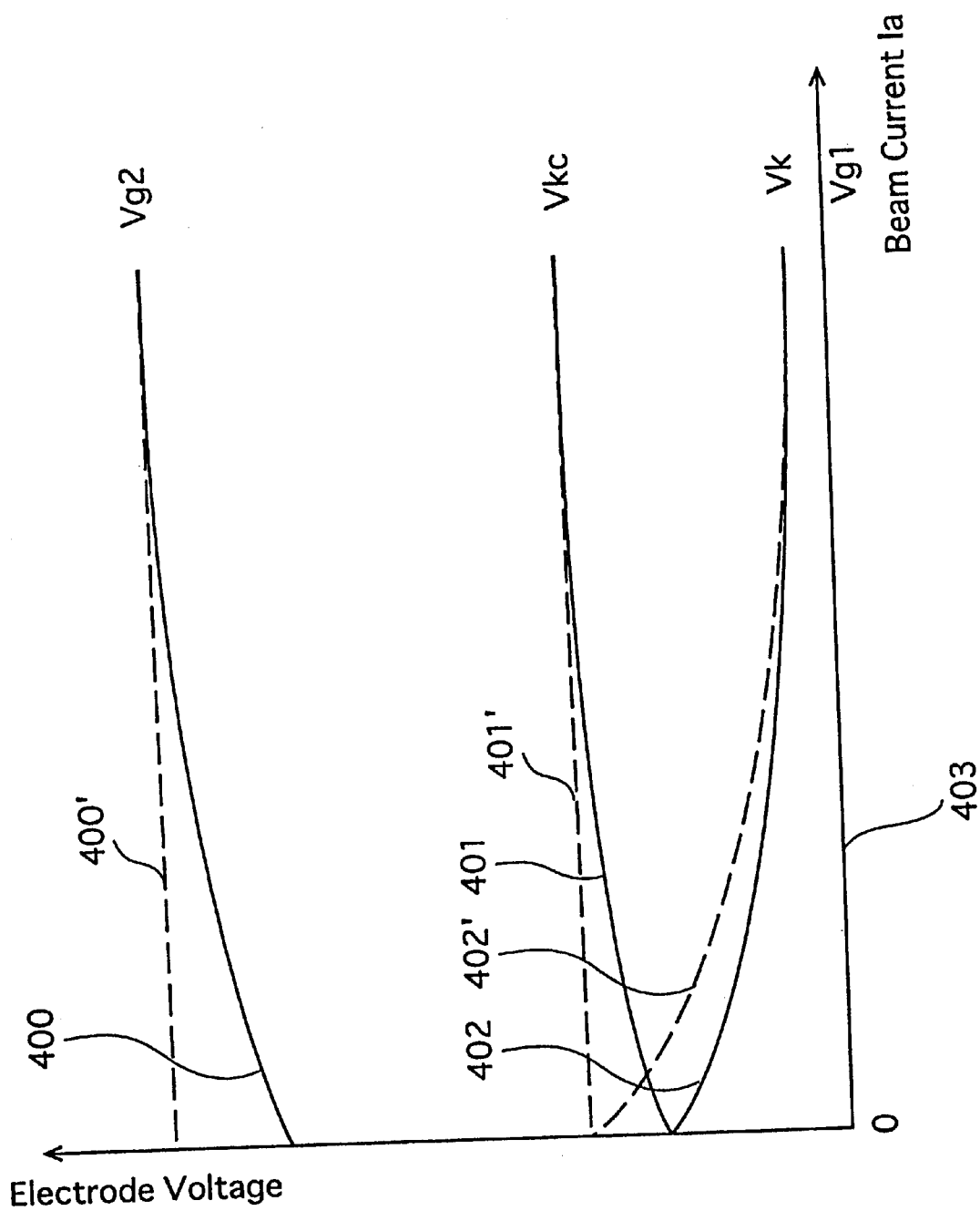
FIG. 11 is a view graphically showing the relations between the current Ia and voltages applied to each electrode regarding the CRT device 2 of the first embodiment along with the relations between the current Ia and voltages applied to each electrode regarding a prior art CRT device of same type.

Next, description is given to the relations between the beam current IA and voltages applied to each electrode. FIG. 11 graphically showing the relations between the current Ia and voltages applied to each electrode regarding the CRT device 2 of this embodiment along with the relations between the current Ia and voltages applied to each electrode regarding a prior art CRT device of same type. Here, the term "a prior art CRT device of same type" refers to a CRT device having exactly the same construction as the CRT device 2 of this embodiment except that the accelerating electrode voltage Vg2 is kept constant.

In FIG. 11, the solid lines 400–403 are graphs showing the relations between the current beam Ia and voltages applied to each electrode in the CRT device 2 of this embodiment. The solid line 400 represents the accelerating electrode voltage Vg2, and the solid line 401 represents the cutoff voltage Vkc. The solid lines 402 and 403 represent the cathode voltage Vk and the control electrode voltage Vg1, respectively.

It should be noted that the control electrode voltage, the accelerating electrode voltage, and the cathode voltage are determined in a manner to pass a required beam current. Here, when the cathode voltage is solely varied while the control electrode voltage as well as the accelerating electrode voltage remains constant at the determined values, there is a moment after which the electron gun no longer emits an electron beam from its cathode. Hereinafter, the value of the cathode voltage at the moment is referred to as the cutoff voltage.

Broken lines 400'–402' are graphs showing the relations between the beam current Ia and voltage applied to each electrode in the prior art CRT device of the same type. The broken lines 400'–402' represent the accelerating electrode voltage Vg2, the cutoff voltage Vkc, and the cathode voltage Vk, respectively. Note that in both CRT devices, the control electrode voltage Vg1 is kept constantly at 0V irrespective of the beam current Ia. As described above, the luminance is in proportional relation with the beam current Ia.

In this embodiment, the accelerating electrode voltage Vg2 is raised as represented by the solid line 400 in accordance with the beam current Ia. As a result, the cathode voltage Vk varies as represented by the solid line 402 in response to the beam current Ia. On the other hand, in the prior art, the accelerating electrode voltage remains constant as represented by the broken line 400' irrespective of the beam current Ia. As a result, the cathode electrode Vk varies as represented by the broken line 402'.

Accordingly, the difference between the cathode voltage Vk and the control electrode voltage Vg1, that is the potential difference between the cathode and the control electrode relative to the beam current Ia falls within a variation narrower range in this embodiment than in the prior art.

Incidentally, the strength of cathode lens varies in accordance with the difference between the cathode voltage Vk and the control electrode voltage Vg1. That is to say, in the prior art, the difference between the cathode voltage Vk and the control electrode voltage Vg1 varies relative to the beam current Ia in a wider range. As a result, the strength of cathode lens greatly varies, and so does the crossover point. This makes it difficult to maintain the beam diameter in an appropriate size independently of the beam current Ia variation.

On the contrary, in this embodiment, the strength of cathode lens varies in a narrower range, and thus the crossover point does not shift much. As a result, it is easier to maintain the beam diameter in an approximate size. Therefore, the spot diameter is minimized at all times independent of the luminance.

Now, description is further given to FIG. 11. Generally, the cutoff voltage Vkc is determined depending on the control electrode voltage Vg1 and the accelerating electrode voltage Vg2. In the prior art, however, the control electrode Vg1 and the accelerating electrode Vg2 are kept constant irrespective of the beam current Ia variation. Consequently, the cutoff voltage Vkc is also constant irrespective of the beam current Ia variation.

In this embodiment, the accelerating electrode voltage Vg2 is controlled to be higher as the beam current Ia is larger, so that the cutoff voltage Vkc becomes higher as the beam current Ia is larger. On the other hand, the control electrode voltage Vg1 is constant irrespective of the beam current Ia. This means that in this embodiment, when the beam current Ia is larger, the difference between the cutoff voltage Vkc and the control electrode voltage Vg1 (Vkc–Vg1) becomes larger as well.

As apparent from FIG. 11, the cathode voltage Vk in this embodiment is lower in comparison with the prior art: the cathode voltage Vk represented by the solid line 402 is lower than the cathode voltage Vk by the broken line 402'. This narrows the variation range of the difference between the cathode voltage Vk and the control electrode voltage Vg1. Consequently, the beam diameter is maintained in an optimum size in the above described mechanism. In other words, in this embodiment, the spot diameter is minimized through controlling the difference between the cutoff voltage Vkc and the control electrode voltage Vg1 (Vkc–Vg1) in accordance with the luminance signals.

[6] Relations between Spot Diameter and Accelerating Electrode Voltage Vg2

Figure 12:
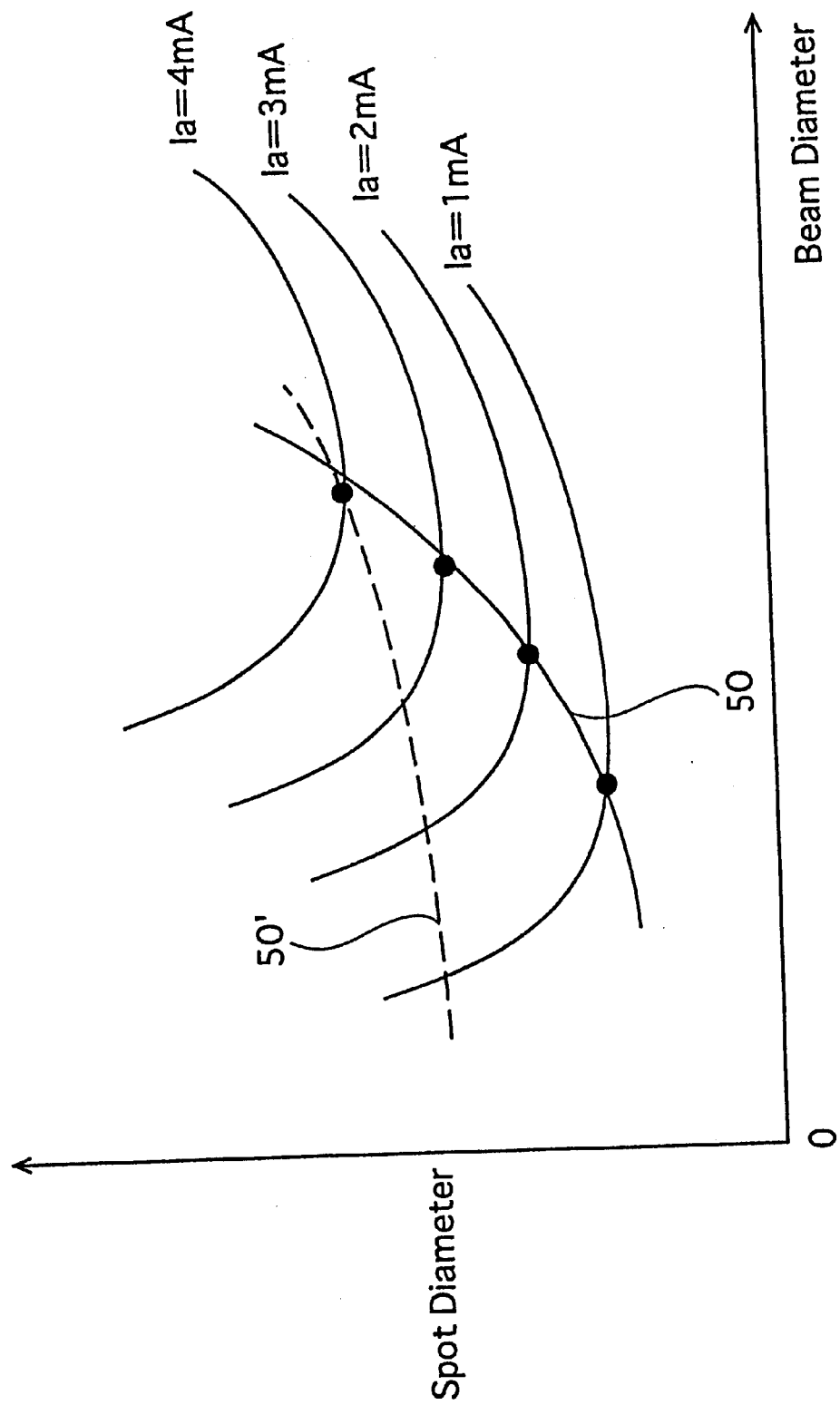
FIG. 12 is a graph showing the relations between the beam diameter and the spot diameter with respect to a different beam current Ia.

Generally, the size of a spot produced on a phosphor screen or the spot diameter varies depending on the value of beam current Ia, and also depending on the beam diameter. In FIG. 12, each graph shows the relations between the beam diameter and the spot diameter with respect to a different beam current Ia. The beam diameter producing the smallest spot diameter with each beam current Ia is referred to as the optimum beam diameter. In FIG. 12, each black dot ● indicates the optimum beam diameter with the corresponding beam current.

In this embodiment, as described above, variation in the strength of cathode lens in response to the change in the beam current Ia is small and thus the variation in the beam diameter is small. Owing to this, through controlling the accelerating electrode voltage Vg2, the beam diameter is adjusted to optimum with any beam current Ia as indicated by the solid line 50 in FIG. 12. Accordingly, there is provided a CRT capable of displaying an image in excellent resolution irrespective of the luminance.

A prior art CRT device is designed to apply a constant voltage to the control electrode, the accelerating electrode, and the like to produce the optimum beam diameter when the beam current Ia is large. With such a CRT device, when the beam current is smaller, the optimum beam diameters are obtained under the conditions, for example, as represented by the broken line 50' in the figure. That is to say, when the beam current Ia is smaller, the resulting beam diameter falls short of optimum to a greater extent, thereby failing to minimize the spot diameter.

[7] Experiment Results

Figure 13:
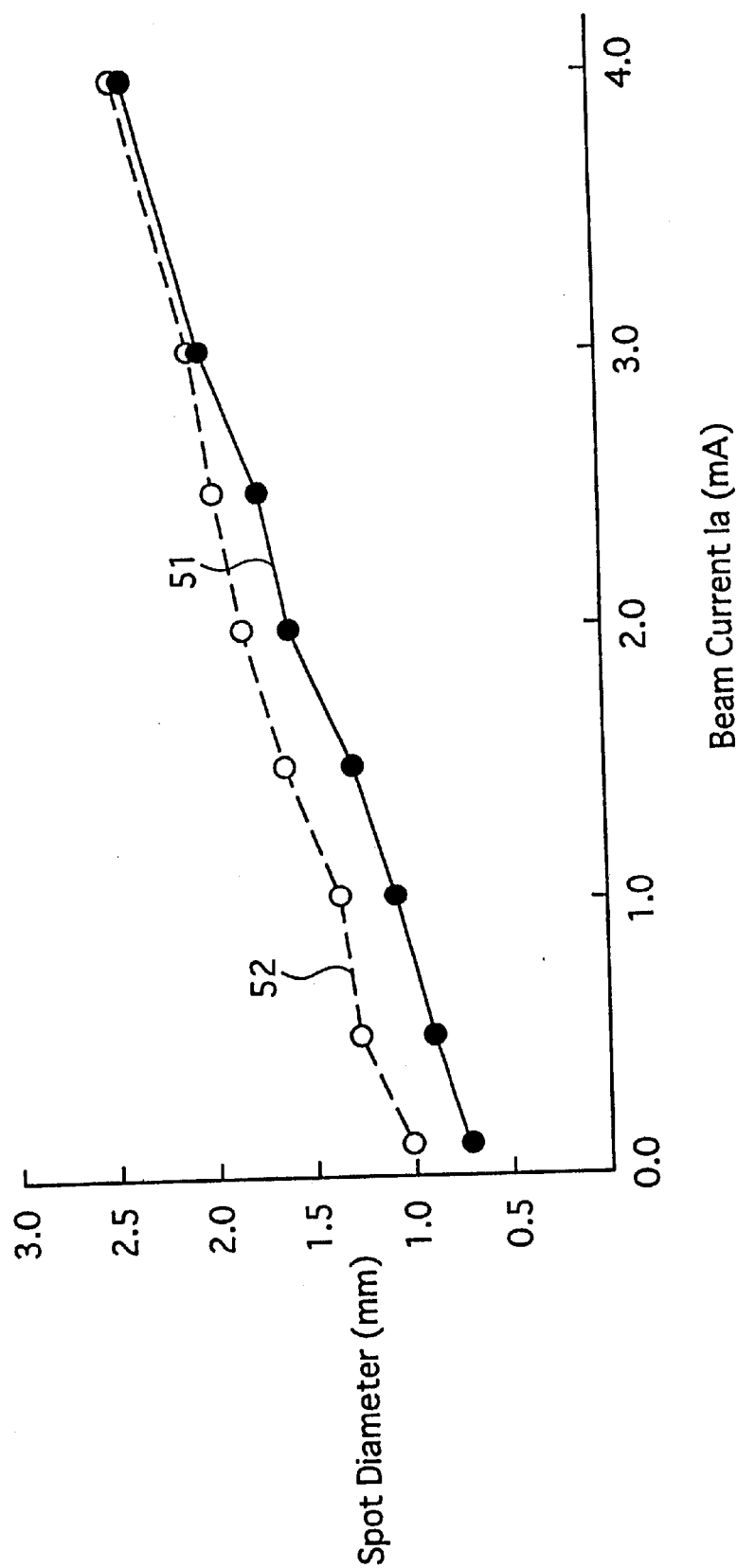
FIG. 13 is a graph showing actual measurements of spot diameters that the CRT device 2 and a prior art CRT device of the same type produced at the center of their respective screens when a different beam current Ia was applied to each CRT device.

FIG. 13 is a graph showing actual measurements of spot diameters that the CRT device 2 and a prior art CRT device of the same type produced at the center of their respective screens when a different beam current was applied to each CRT device. In FIG. 13, a solid line 51 represents the relations between the spot diameter and the beam current regarding the CRT device of this embodiment, while a broken line 52 indicates those regarding the prior art picture device of the same type.

Prior to the measurement, the electron gun of the prior art CRT device was adjusted in such a manner to apply voltages to each electrode so that an electron beam would produce an optimum beam diameter when the luminance was high. As shown in FIG. 13, it is confirmed that the CRT device 2 produced smaller spot diameters comparing to those by prior art at any beam current Ia, meaning at any luminance level.

Further, another measurement was performed on the CRT device 2 to obtain the variation range of accelerating electrode Vg2 in relation to the variation made in the beam current Ia (within the range from 0 A to 4 mA). By the measurement, it was confirmed that the variation range of accelerating electrode voltage Vg2 was about 200V. When the variation range falls within about 200V, the accelerating electrode voltage Vg2 is variable at high speed (several MHz to tens of MHz) without the need for having a large scale amplifier circuit. Thus, the measurement result demonstrated practicability of the CRT device 2.

[8] Modifications of First Preferred Embodiment

It goes without saying that the present invention is not limited to the specific embodiment disclosed above, and the first embodiment may be transformed into various other modifications such as the following.

[8-1]

In the first embodiment, the accelerating electrode voltages Vg2 are separately applied and controlled for each of the three colors RGB. Yet, the following alternative is applicable. That is, separate accelerating electrodes are provided for each of the three colors RGB, but only one of the accelerating electrode voltages Vg2 is varied in relation to the luminance signal, while the other two accelerating electrode voltages Vg2 are kept constant.

For example, only the accelerating electrode of the cathode for a green phosphor, which has high spectral luminous efficiency, may be made variable. This construction reduces the size of green spot that controls the size of spot where three beams are overlapped with each other, thereby improving the resolution. Concurrently, this construction eliminates the need for circuits for controlling accelerating electrodes of the other two colors, which is also advantageous in terms of cost.

[8-2]

Figure 14:
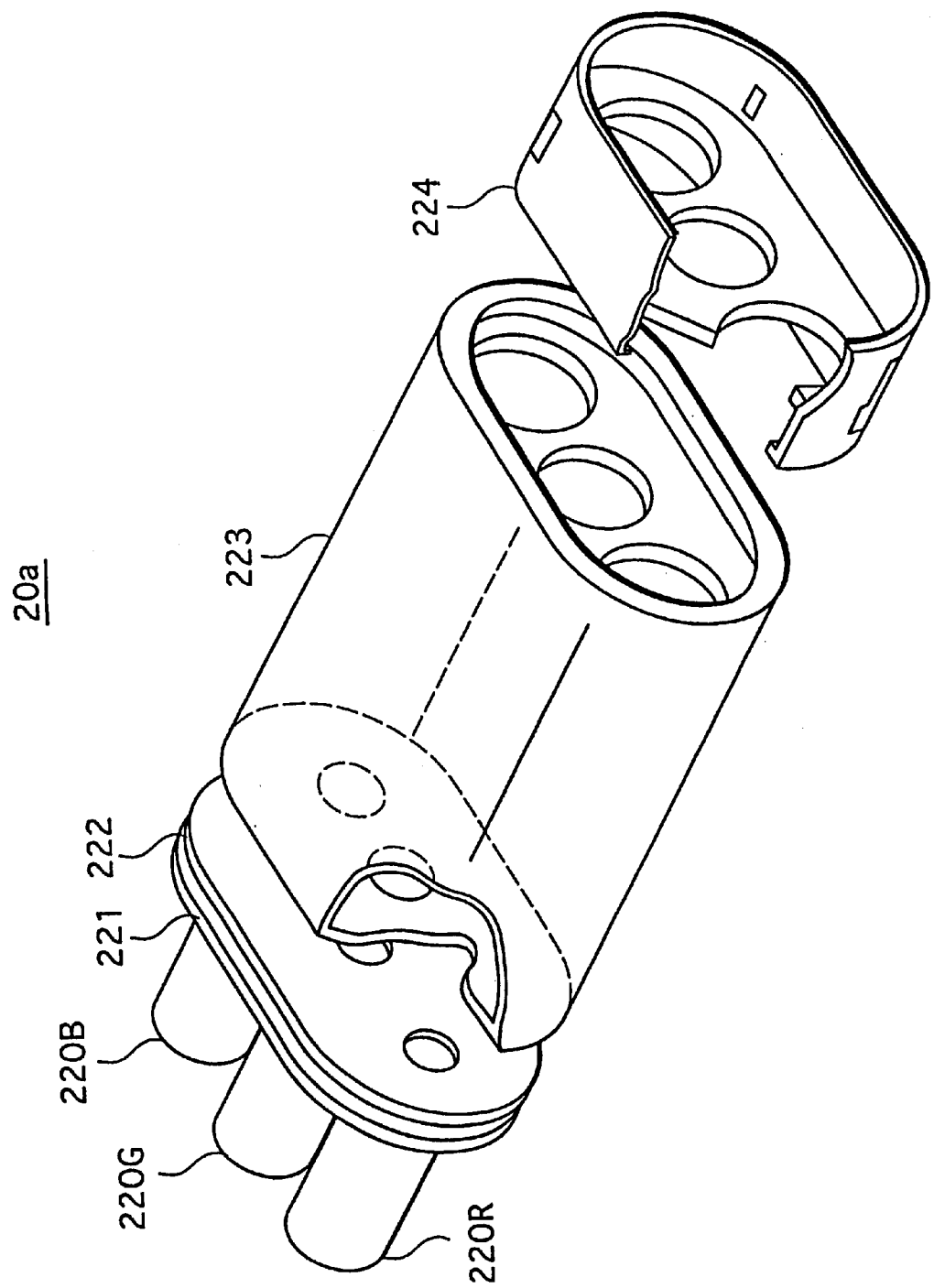
FIG. 14 is an external oblique view showing an electron gun composed of a single accelerating electrode for all the three colors RGB with the focusing electrode and the other electrodes being partly broken to show other components.

In the first embodiment, separate accelerating electrodes are provided for each of the three colors RGB. Yet, the following alternative is applicable. That is, a single accelerating electrode is provided for all the three colors RGB. FIG. 14 is an external oblique view showing an electron gun composed of a single accelerating electrode for all the three colors RGB. Similarly to FIG. 3, the electrodes are partly broken to show other components.

In FIG. 14, an electron gun 20a has a generally similar construction to that of the electron gun 20 shown in FIG. 3, and is constructed of cathodes 220R-220B in inline arrangement, a control electrode 221, an accelerating electrode 222, a focusing electrode 223, and a final accelerating electrode 224.

(a) In this case, for example, it is preferred that the accelerating electrode voltage Vg2 be controlled in accordance with the color having the highest luminance (i.e. the color having the largest beam current Ia) among the three colors RGB. Since the spot diameter tends to be larger as the luminance becomes higher, the spot produced on the phosphor screen where the three beams of RGB overlap with each other has the same diameter with that produced by the beam having the highest luminance. Consequently, the spot diameter produced on the phosphor screen is reduced in size through controlling the accelerating electrode voltage Vg2 in accordance with the luminance signal of the color having the highest luminance among the three colors RGB i.e. the luminance signal referred to as the highest-luminance-level luminance signal. As a result, the resolution of the CRT device is improved.

(b) Alternatively, for example, it is also applicable to control the accelerating electrode voltage Vg2 in accordance with the luminance signal corresponding to green. Among the three colors RGB, green is the color with the highest spectral luminous efficiency and thus is the most predominant in spot diameter perception.

(c) Alternatively, the accelerating electrode voltage Vg2 may be controlled in accordance with an index that is obtained by weighting the beam currents Ia corresponding to each of the three colors RGB in a predetermined manner and then adding the resulting values. The weighting may be carried out in accordance with spectral luminous efficiency of each of the three colors RGB, or with alternative elements.

[8-3]

In the first embodiment, description is given to the case where the present invention is applied to a color CRT device having three cathodes. Yet, applicability of the present invention is not limited to such a CRT device. The present invention is also applicable to a monochrome CRT device which has a single cathode.

[8-4]

In the first embodiment, the accelerating electrode voltages Vg2 are controlled in accordance with the luminance signals of individual spots to minimize the spot diameter. Yet, the following alternative is applicable.

For example, the accelerating electrode voltage Vg2 may be determined according to an average luminance of one screen (one frame), that is obtained by averaging luminance signals of the entire screen, and the accelerating electrode voltage Vg2 may be varied frame by frame. Alternatively, the average luminance may be obtained from the scope other than one flame. For example, the average luminance may be obtained at predetermined time intervals and the accelerating electrode voltage Vg2 may be determined according to the obtained result. In this manner, the accelerating electrode voltage Vg2 is varied less frequently, which reduces the cost of a circuit for applying a voltage to each accelerating electrode.

Further, the accelerating electrode voltage Vg2 may be determined according to the following alternatives to the average luminance. These alternatives include signals obtained by processing the luminance signals using a low-pass filter, and signals obtained through envelope detection of peak values of the luminance signals.

[8-5]

In the first embodiment, the accelerating electrode voltage Vg2 is controlled independently of the values of beam current Ia so as to produce the beam spot in optimum diameter and thus to keep the spot diameter smallest. Yet, the following alternative is applicable.

For example, in the case where the beam current Ia possibly takes on values ranging from 0 mA to 4 mA, the accelerating electrode voltage Vg2 may be determined according to the beam current Ia when the beam current Ia is within the range from 0 mA to 3 mA. When the beam current Ia is within the range from 3 mA to 4 mA, the accelerating electrode voltage Vg2 may be set to correspond to the current value Ia of 3 mA.

In this manner, the range within which the accelerating electrode voltage Vg2 falls is narrowed, which requires lower withstand voltage for a circuit such as amplifier used to apply a voltage to each accelerating electrode. As a consequent result, both power consumption and manufacturing cost of the circuit are reduced.

[8-6]

Figure 15:
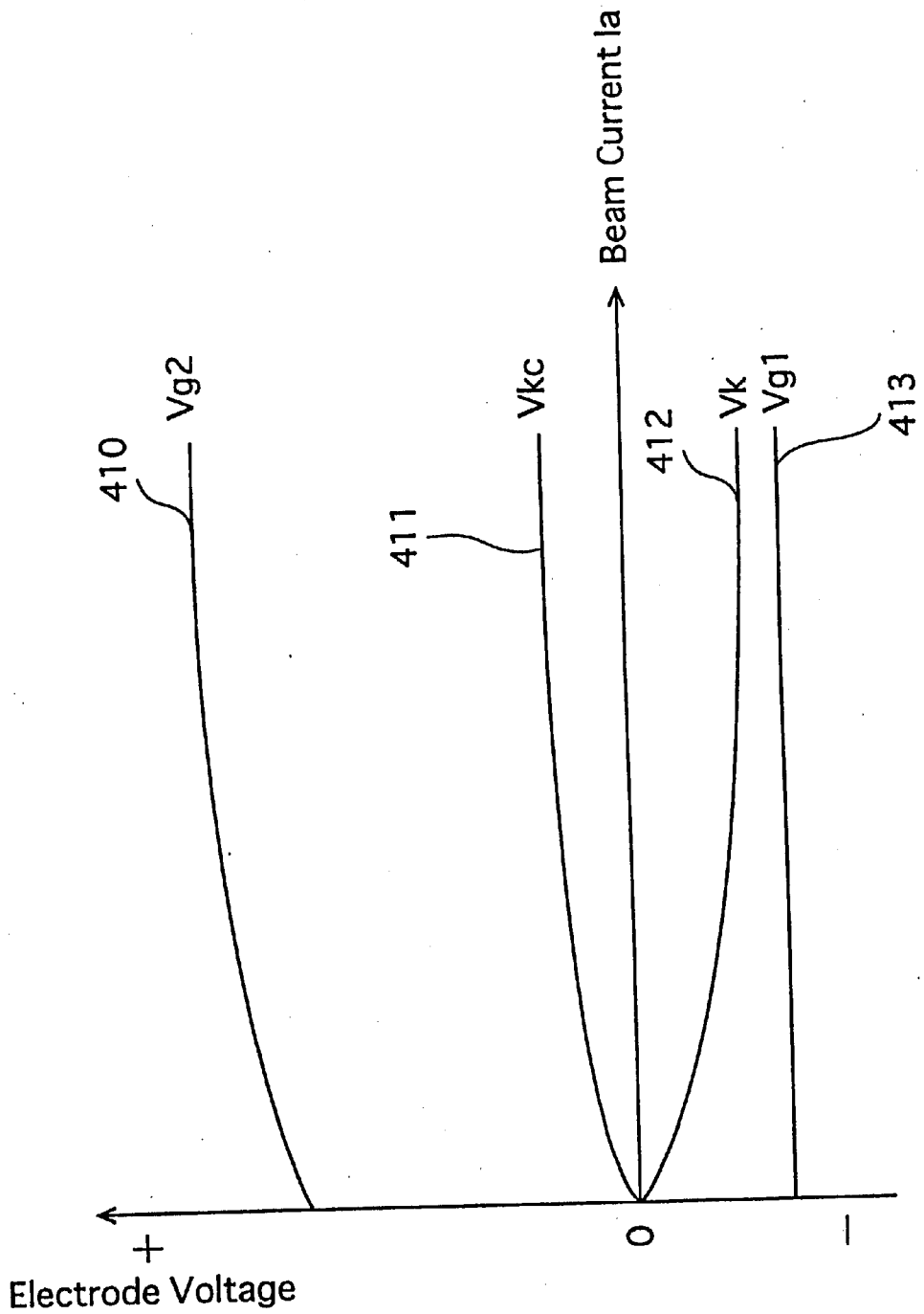
FIG. 15 is a graph showing the cathode voltage Vk, the cutoff voltage Vkc, the control electrode voltage Vg1 and the accelerating electrode voltage Vg2 in relation to the beam current Ia.

In the first embodiment, the control electrode voltage Vg1 is kept constant at 0V. Yet, the following alternative is applicable. That is, the control electrode voltage Vg1 may be a negative voltage. FIG. 15 is a graph showing the cathode voltage Vk, the cutoff voltage Vkc, the control electrode voltage Vg1 and the accelerating electrode voltage Vg2 in relation to the beam current Ia. Solid lines 410–413 represent the accelerating electrode voltage Vg2, the cutoff voltage Vkc, the cathode voltage Vk, and the control electrode voltage Vg1, respectively.

As shown in FIG. 15, by keeping the control electrode voltage Vg1 at a constant negative value, the absolute values of electrode voltages are held small while the relations between the electrode voltages are maintained in a similar manner to the ones shown in FIG. 11. This lowers the withstand voltage required for a circuit used to apply a voltage to each accelerating electrode. As a consequent result, both power consumption and manufacturing cost of the circuit are reduced.

[8-7]

Figure 16:
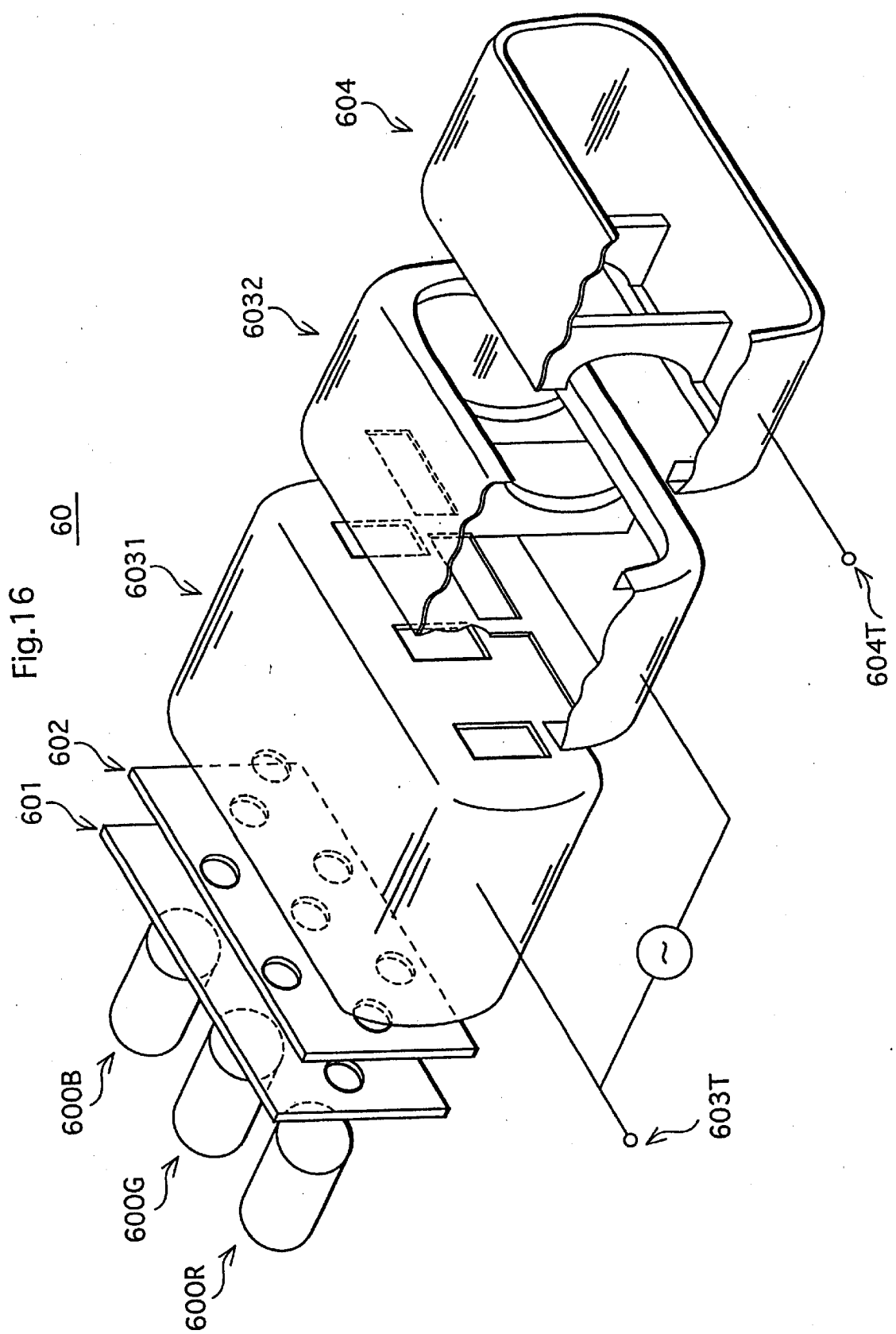
FIG. 16 is an external oblique view showing a dynamic type electron gun.

In the first embodiment, the focusing electrode and the final accelerating electrode are both applied constant voltages. Yet, the following alternative is applicable. That is, the present invention may be applied to an electron gun of so-called dynamic type, in which the voltage applied to the focusing electrode is varied according to the deflection angle of electron beam. FIG. 16 is an external oblique view showing such a dynamic type electron gun.

As shown in FIG. 16, a dynamic type electron gun 60 is constructed of cathodes 600R–600G in inline arrangement, a control electrode 601, an accelerating electrode 602, a first focusing electrode 6031, a second focusing electrode 6032, and a final accelerating electrode 604.

The first focusing electrode 6031 and the final accelerating electrode 604 are applied with constant voltages from terminals 603T and 604T, respectively. The second focusing electrode 6032 is applied with a voltage that varies in synchronism with the vertical deflection of the electron beam so as to adjust the focus.

By applying the present invention to the electron gun 60 as above, the spot diameter is minimized irrespective of the luminance. Incidentally, in the above construction, the accelerating electrode 60 may be separately provided for each color.

Apart from the above construction, in the case of an electron gun using magnetic filed or the like to generate a main lens, a focusing electrode and a final accelerating electrode may be omitted, i.e. the electron gun may be constructed of a cathode, a control electrode, and an accelerating electrode only. The present invention is also applicable to such an electron gun.

[8-8]

The present invention may be carried out in combination with other techniques for controlling the spot diameter and the beam diameter, for example, with the technique disclosed in Japanese Patent Examined Publication No. HEI 1(1989)-032623. The CRT device disclosed therein realizes a smaller spot diameter when the beam current Ia is larger. In combination with such a technique, the present invention produces a spot in a smaller diameter than would otherwise be larger when the luminance is high. This results in the CRT device with improved resolution.

[8-9]

In the above embodiment, the CRT device is described to have the screen size of 76 cm and the deflection angle of 106°. Yet, the CRT device consistent with the present invention is not limited to such as above, and the same effect is achieved with a CRT device that is different from the above description in screen size and a deflection angle.

Further, the control electrode 201 and other components are described with the above sizes merely as examples, and they may be different in size. Likewise, the voltages applied to each electrode are not limited to the specific values described above, and the present invention achieves the same effect even with different voltages.

[9] Second Preferred Embodiment

Now, description is given to a CRT device according to a second embodiment of the present invention. The CRT device of this embodiment has the construction generally similar to that of the CRT device according to the first embodiment, yet differs in that the cathode voltage Vk is kept constant irrespective of the beam current Ia variation.

Similarly to the electron gun of the first embodiment, the electron gun included in the CRT device of this embodiment has the construction as shown in FIG. 3. Different from the first embodiment in which the cathode voltage Vk is varied according to change in the amount of beam current Ia, in this embodiment, three cathodes constituting the electron gun are applied with constant voltages from their respective direct-current power supplies at all times. With this construction, each cathode voltage Vk is kept constant at all times.

Figure 17:
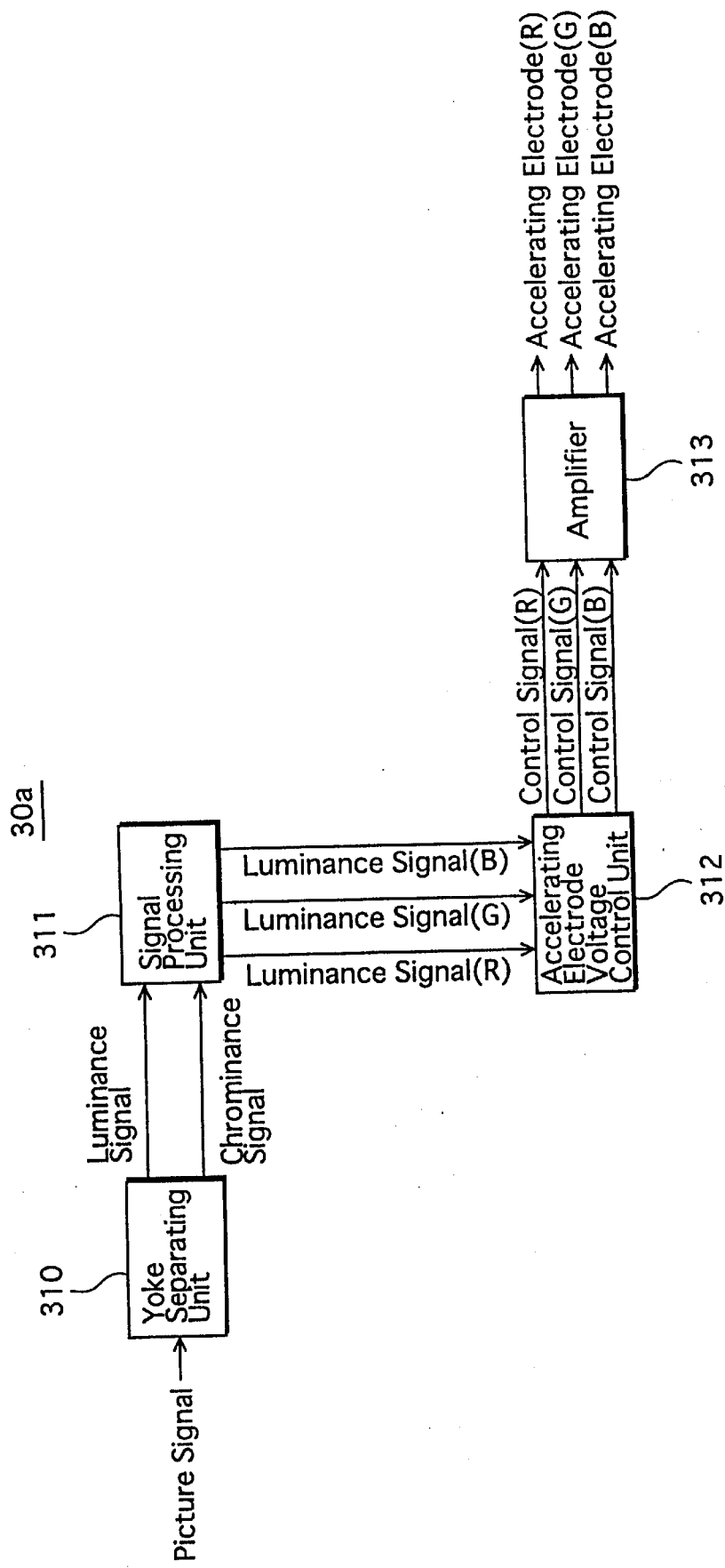
FIG. 17 is an explanatory block diagram showing the construction and function of a control circuit of the second embodiment for controlling the accelerating electrode voltage Vg2.

Further, similarly to the first embodiment, the voltage Vg2 applied to each accelerating electrode is varied according to changes in the amount of beam current Ia. FIG. 17 is an explanatory block diagram showing the construction and function of a control circuit of this embodiment for controlling each accelerating electrode voltage Vg2.

In FIG. 17, similarly to the control circuit 30 of the first embodiment, a control circuit 30a is constructed of a YC separating unit 310, a signal processing unit 311, an accelerating electrode voltage control unit 312, and an amplifier 313. As described above, each cathode voltage Vk in this embodiment is kept constant and thus requires no control, so that there is no component corresponding to the amplifier 303 shown in FIG. 5.

Similarly to the first embodiment, when picture signals are inputted to the control circuit 30a, the YC separating unit 310 separates them into luminance signals (Y) and chrominance signals (C). Then, the signal processing unit 311 conducts various processing such as picture quality adjustment, contrast control, and the like to convert the passed signals into luminance signals (R)–(B), and inputs the resulting signal to the accelerating electrode voltage control unit 312.

Upon receipt of the luminance signals (R)–(B), the accelerating electrode voltage control unit 312 determines voltages Vg2 to be applied to each accelerating electrode, and inputs to the amplifier 313 control signals (R)–(B) representing the determined accelerating electrode voltages Vg2. Upon receipt of the control signals (R)–(B), the amplifier 313 amplifies the received signals to set each accelerating electrode voltage Vg2 at the desired value. In this manner, each accelerating electrode voltage Vg2 in the end is controlled to a value corresponding to each beam current Ia.

Here, the accelerating electrode voltage control unit 312 may have the construction similar to that of the accelerating electrode voltage control unit 302 shown as an example in FIG. 7. In addition, data for the table correlating the luminance signals and the control signals may be determined by actual measurement as in the first embodiment to embody the accelerating electrode voltage control unit 312 of this embodiment.

Figure 18:
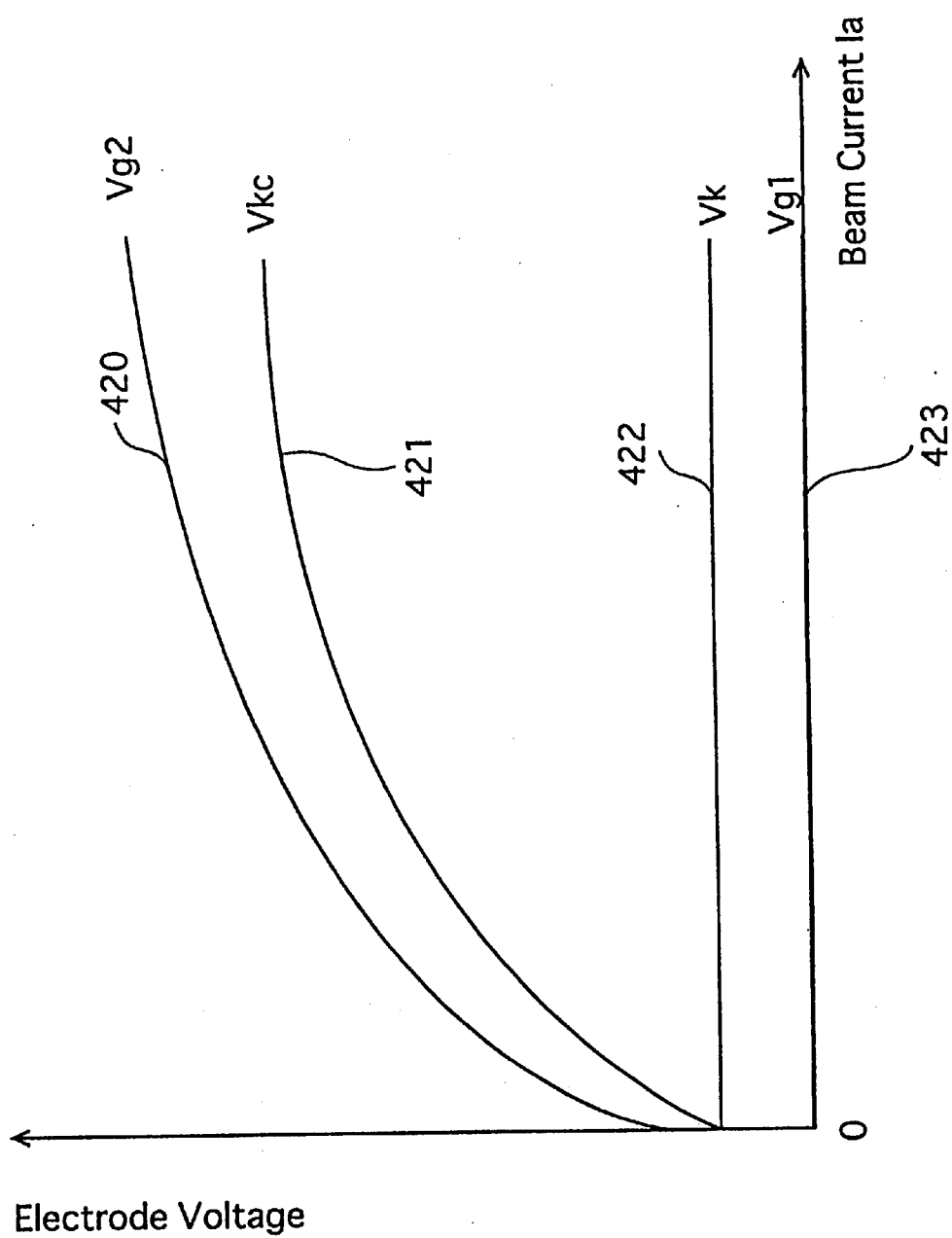
FIG. 18 is a view showing the operation characteristics of the electron gun included in the CRT device according to the second embodiment by way of a graph showing variations in the cathode voltage Vk, the cutoff voltage Vkc, the control voltage Vg1, and accelerating electrode voltage Vg2 in relation to the beam current Ia.

Now, FIG. 18 is a view showing the operation characteristics of the electron gun included in the CRT device according to this embodiment by way of a graph showing variations in the cathode voltage Vk, the cutoff voltage Vkc, the control voltage Vg1 and accelerating electrode voltage Vg2 in relation to the beam current Ia. In FIG. 18, solid lines 420–423 represent the accelerating electrode voltage Vg2, the cutoff electrode voltage Vkc, the cathode electrode voltage Vk, and the control electrode voltage Vg1, respectively.

As shown in FIG. 18, the control electrode voltage Vg1 is kept constant at 0V at all times irrespective of the beam current Ia variation. Similarly, the cathode voltage Vk is also kept constant (at 50V in this embodiment) at all times. The accelerating electrode voltage Vg2 is controlled by the accelerating electrode voltage control unit 312 to be larger as the beam current Ia becomes larger.

Under the control exerted by the accelerating electrode voltage control unit 312, the cutoff voltage Vkc becomes equal to the cathode voltage Vk when the beam current Ia is zero, and becomes larger as the beam current Ia is larger. On the other hand, similarly to the above, the control electrode voltage Vg1 is kept constant irrespective of the beam current Ia variation. Consequently, in this embodiment, just as the first embodiment, when the beam current Ia is larger, the difference (Vkc–Vg1) between the cutoff voltage Vkc and the control electrode voltage Vg1 becomes larger as well.

According to this embodiment, as the beam current becomes larger, the difference (Vg1–Vg2) between the control electrode voltage Vg1 and the accelerating electrode voltage Vg2 becomes larger, thus decreasing the strength of pre-focusing lens. On the other hand, the difference (Vk–Vg1) between the cathode voltage Vk and the control electrode voltage Vg1 remains constant irrespective of the beam current Ia variation, so that the strength of cathode lens also remains constant irrespective of the beam current Ia variation.

It should be noted here that among the lenses generated by the electron gun, the cathode lens is the one that mainly determines the beam diameter, while the pre-focusing lens has little effect on the beam diameter. Consequently, in this embodiment, the control electrode voltage Vg1 is adjusted so as to stably maintain the beam diameter in an appropriate size irrespective of the amount of beam current Ia, thereby keeping the spot diameter small.

In addition, since the cathode voltage Vk in this embodiment is kept constant as described above, a direct-current power supply alone is sufficient to supply power to each cathode. Thus, it is sufficient to provide an amplifier circuit for controlling signals of the beam current Ia only for each accelerating electrode. This is advantageous in that the electron gun is simplified in the construction of its peripheral circuit.

[10] Third Preferred Embodiment

Next, description is given to a CRT device according to a third embodiment of the present invention. The CRT device in this embodiment has the construction generally similar to that of the CRT device according to the first embodiment. Yet, unlike the picture device of the first embodiment, the CRT device in this embodiment keeps the accelerating electrode voltage Vg2 constant irrespective of the beam current Ia variation, and that the control electrode voltage Vg1 is decreased as the beam current becomes larger.

Figure 19:
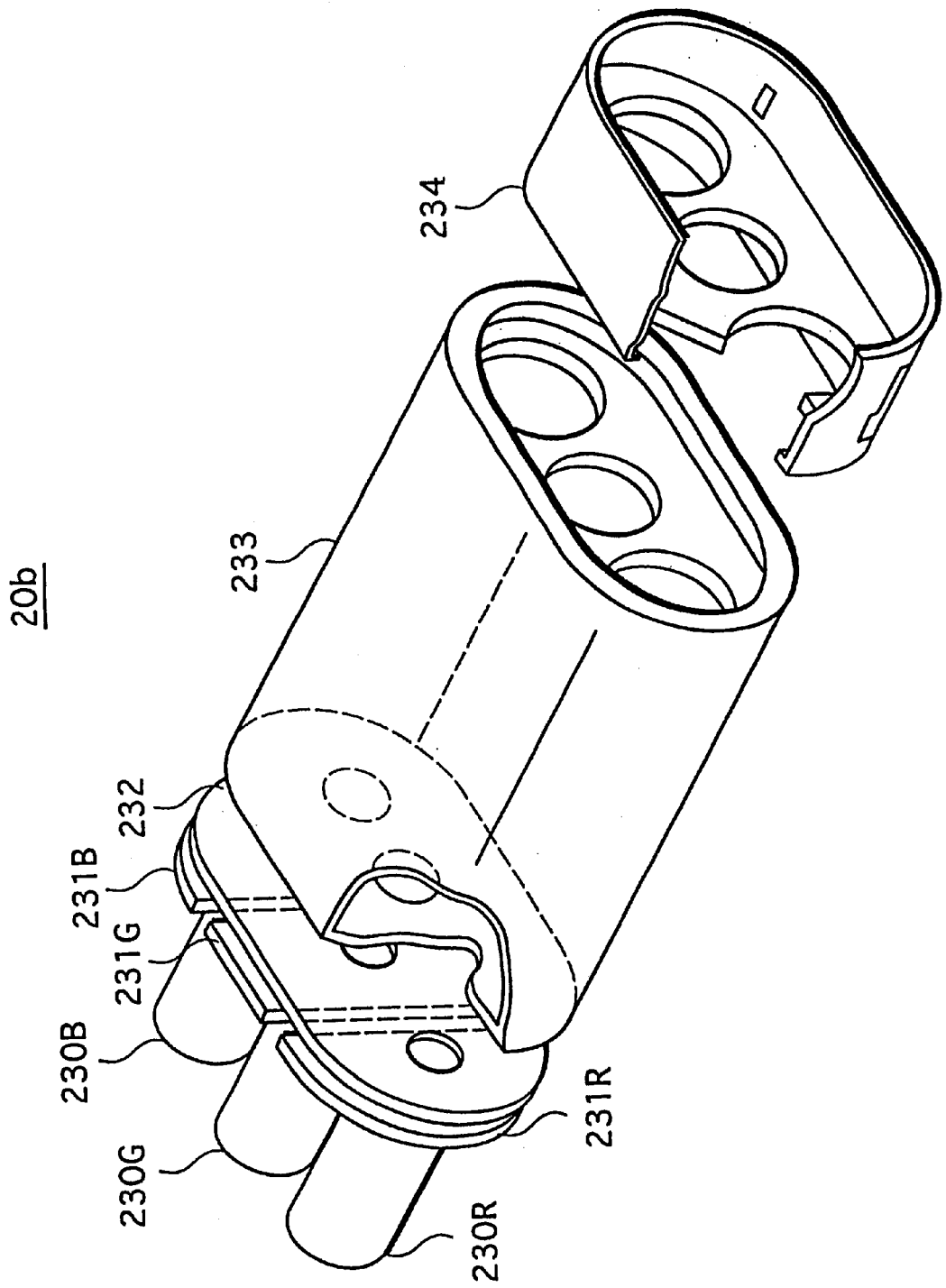
FIG. 19 is an external oblique view showing the construction of an electron gun according to the third embodiment.

The electron gun included in the CRT device according to this embodiment has the construction generally similar to that of the electron gun included in the picture device according to the first embodiment. FIG. 19 is an external oblique view showing the construction of an electron gun 20b according to this embodiment. Different from the first embodiment (FIG. 3) in which the control electrode 201 is shared among the three colors RGB, three control electrodes 231R–231B are provided in this embodiment (FIG. 19). In addition, unlike FIG. 3 in which three accelerating electrodes 202R–202B are provided separately for the three colors of RGB, the electron gun in FIG. 19 includes a single accelerating electrode 232 commonly for the three colors.

Further, in the first embodiment, the voltage Vg2 applied to each accelerating electrode 202 is varied in accordance with the amount of beam current Ia, and the voltage Vg1 applied to the control electrode 201 is kept at a constant value at all times irrespective of the beam current Ia variation. Contrary, in this embodiment, the voltage Vg2 applied to the accelerating electrode 232 is kept at a constant value at all times irrespective of the beam current Ia variation, and the voltages Vg1 applied to each of the control electrodes 231R–231B are controlled to be lower as the amount of the beam current Ia is larger.

Figure 20:
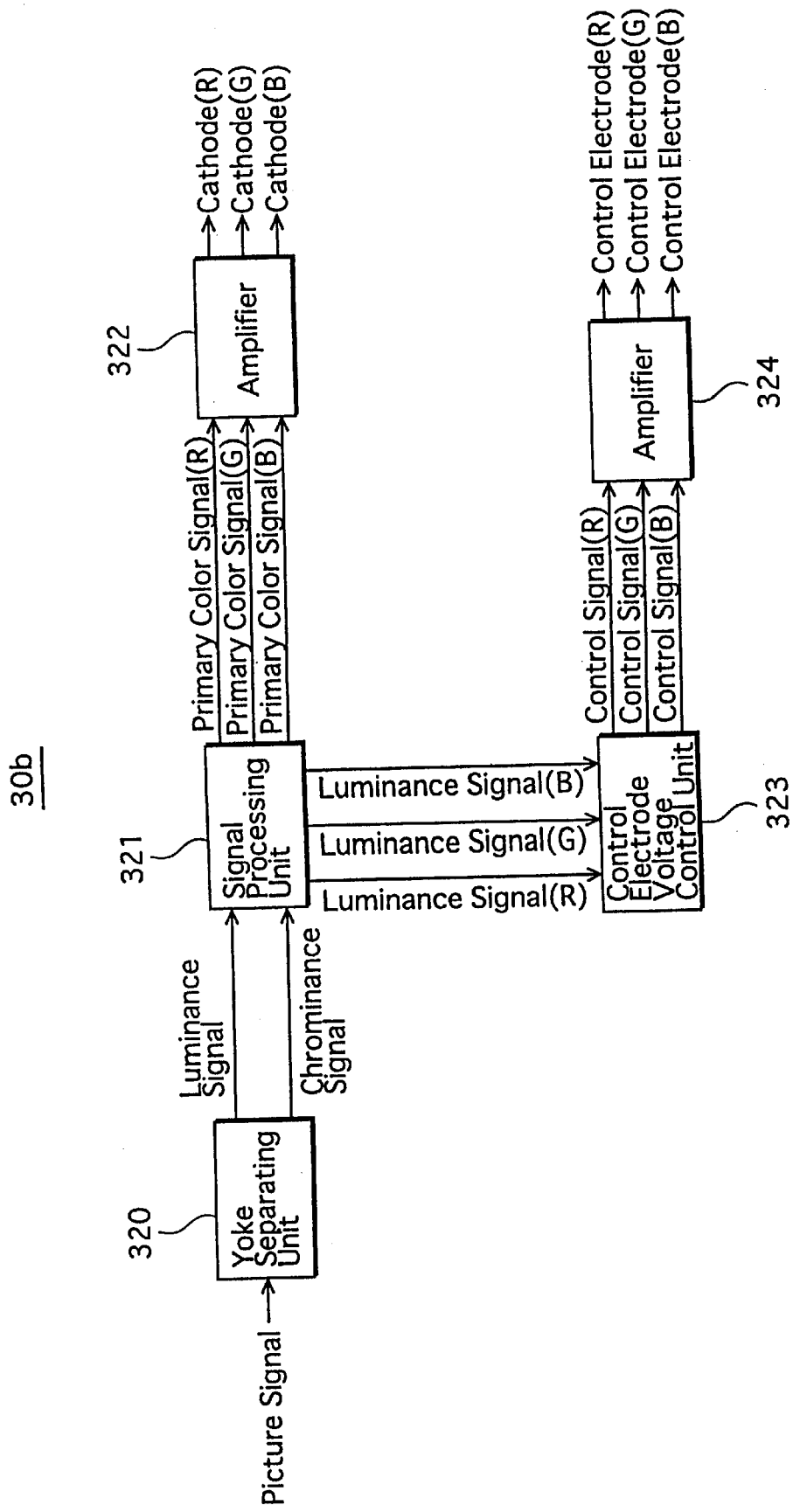
FIG. 20 is an explanatory block diagram showing the construction and function of a control circuit for controlling voltages applied to the control electrodes 231R–231B.

FIG. 20 is an explanatory block diagram showing the construction and function of a control circuit for voltages applied to the control electrodes 231R–231B. In FIG. 20, a control circuit 30b is constructed of a YC separating unit 320, a signal processing unit 321, a control electrode voltage control unit 323, and amplifiers 322 and 324. The YC separating unit 320 receives picture signals and separates them into luminance signals (Y) and chrominance signals (C) and outputs the resulting signals.

The signal processing unit 321 receives the luminance signals (Y) and chrominance signals (C) and conducts processing such as image quality adjustment. The signal processing unit 312 then outputs primary color signals (R)–(B) to the amplifier 322, and luminance signals (R)–(B) to the control electrode voltage control unit 323. Upon receipt of the primary color signals (R)–(B), the amplifier 322 separately applies voltages in accordance with the received signals to the cathodes (R)–(B) corresponding to each of the colors RGB.

Upon receipt of the luminance signals (R)–(B), the control electrode voltage control unit 323 outputs control signals (R)–(B). The amplifier 324 receives and amplifies the control signals (R)–(B) so as to adjust the control electrode voltages Vg1 to desired values. In the above manner, the control electrode voltages Vg1 are in the end controlled to the values corresponding to the beam current Ia.

Here, the control electrode voltage control unit 323 may have, for example, the construction similar to that of the control electrode voltage control unit 302 of the first embodiment shown as an example in FIG. 7. In addition, data for the table correlating the luminance signals and the control signals may be determined by actual measurement as in the first embodiment so as to embody the control electrode voltage control unit 323.

Figure 21:
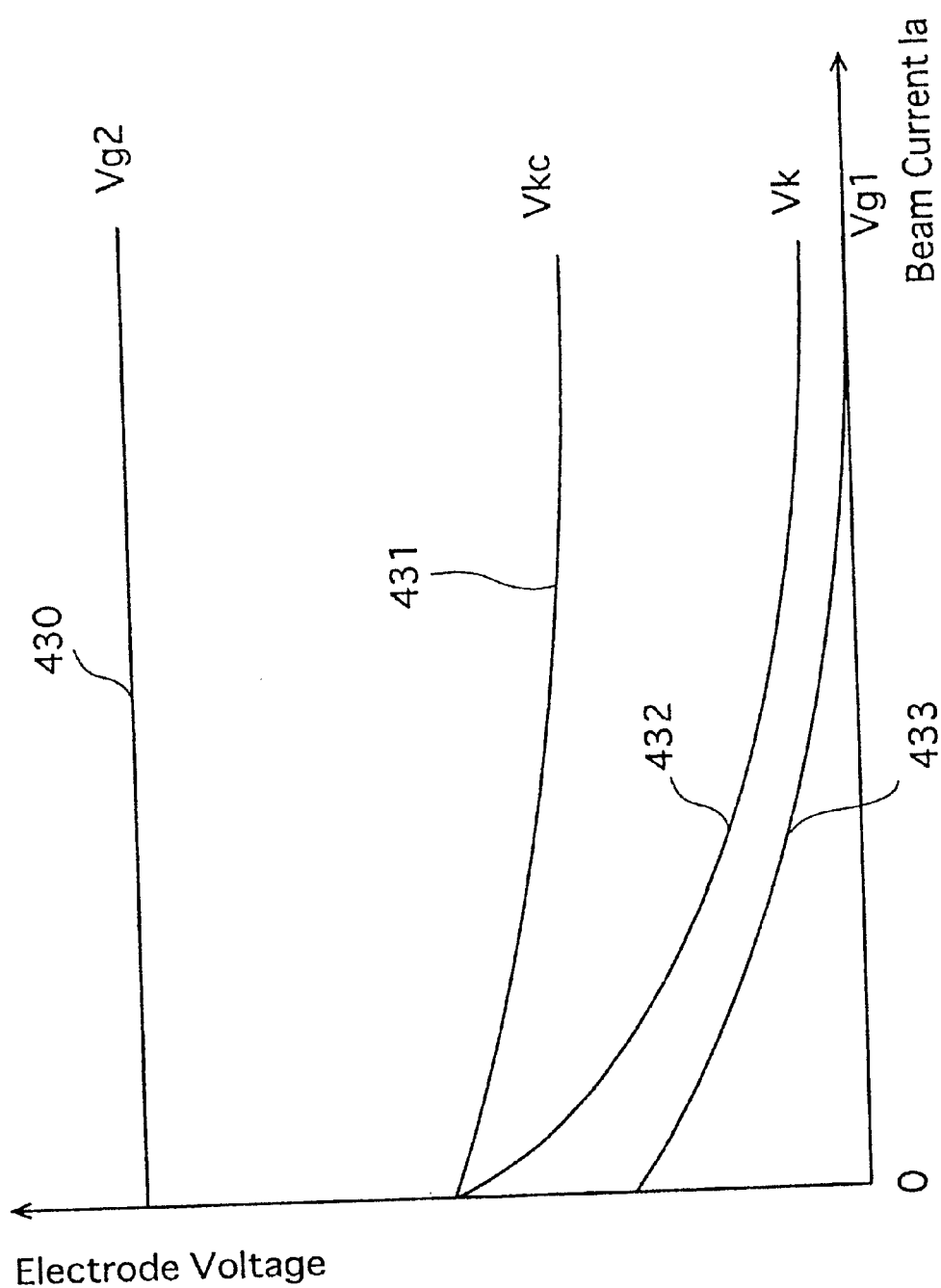
FIG. 21 is a view showing the operation characteristics of the electron gun 20b by way of a graph showing variations in the cathode voltage Vk, the cutoff voltage Vkc, the control electrode voltage Vg1, and the accelerating electrode voltage Vg2 in relation to the beam current Ia.

Next, description is given to the operation characteristics of the electron gun 20b included in the CRT device according to this embodiment. FIG. 21 is a view showing the operation characteristics of the electron gun 20b by way of a graph showing variations in the cathode voltage Vk, the cutoff voltage Vkc, the control electrode voltage Vg1 and the accelerating electrode voltage Vg2 in relation to the beam current Ia. In FIG. 21, solid lines 430–433 represent the accelerating electrode Vg2, the cutoff voltage Vkc, the cathode voltage Vk, and the control electrode voltage Vg1, respectively.

As shown in FIG. 21, the accelerating electrode voltage Vg2 is kept constant (at 500V in this embodiment) at all times irrespective of the beam current Ia variation. On the other hand, the cutoff voltage Vkc, the cathode voltage Vk and the control electrode voltage Vg1 are all dropped as the beam current Ia becomes larger. In addition, when the beam current Ia is equal to zero, the cathode voltage Vk and the cutoff voltage Vkc are equal to each other.

Figure 22:
FIG. 22 is a graph obtained through variable conversion of the graph shown in FIG. 21 and shows the difference (Vg2−Vg1) between the accelerating electrode Vg2 and the control electrode voltage Vg1, the difference (Vkc−Vg1) between the cutoff voltage Vkc and the control electrode voltage Vg1, and the difference (Vk−Vg1) between the cathode voltage Vk and the control electrode voltage Vg1 in relation to the beam current Ia.

FIG. 22 is a graph obtained through variable conversion of the graph shown in FIG. 21 and shows the difference (Vg2–Vg1) between the accelerating electrode Vg2 and the control electrode voltage Vg1, the difference (Vkc–Vg1) between the cutoff voltage Vkc and the control electrode voltage Vg1, and the difference (Vk–Vg1) between the cathode voltage Vk and the control electrode voltage Vg1 in relation to the beam current Ia. In FIG. 22, solid lines 430'–433' represent the difference Vg2–Vg1 in voltage, the difference Vkc–Vg1 in voltage, and the difference Vk–Vg1 in voltage, respectively.

Comparing the graph shown in FIG. 22 with the graph shown with the solid line in FIG. 11, it is apparent that the CRT device of this embodiment exhibits the similar operation characteristics to those of the CRT device of the first embodiment with respect to the control voltage Vg1. Accordingly, similarly to the CRT device of the first embodiment, the strength of cathode lens in the CRT device of this embodiment varies little irrespective of the beam current Ia variation, which leads to that the spot diameter is minimized at all times irrespective of the luminance.

Further, different from the above first and the second embodiments in which the accelerating electrode voltage Vg2 is varied, in this embodiment, the control electrode voltage Vg1 is varied in accordance with the luminance signals. Here, the control electrode voltage Vg1 is low at the potential in comparison with the accelerating electrode voltage Vg2, so that the control electrode voltage control circuit 30b is embodied using a component having a lower withstand voltage. This is advantageous in that the control electrode voltage control circuit 30b is low both in power consumption and in manufacturing cost.

[11] Modifications of Third Preferred Embodiment

The third embodiment may be transformed into various other modifications such as the following.

[11-1]

In the above description, it is described that the control electrode is separately provided for each color of RGB. Yet, the following alternative is applicable. That is, a single control electrode is provided for all the three colors RGB. Here, for example, the control electrode may be applied with a voltage in accordance with the beam current having the largest current amount among the beam currents flowing through each of the tree cathodes.

[11-2]

Similarly to the above [8-4], the third embodiment may be modified as follows. That is, the control electrode voltage Vg1 may be varied according to an average luminance of each screen. Alternatively, the average luminance may be obtained from the scope other than one flame. Both manners reduce production cost of a circuit, such as an amplifier, for applying a voltage to the controlling electrode.

Further, the control electrode voltage Vg1 may be determined according to the following alternatives to the average luminance. These alternatives include signals obtained by processing the luminance signals using a low-pass filter, and signals obtained through envelope detection of peak values of the luminance signals.

[11-3]

Similarly to the above [8-5], the third embodiment may be modified to vary the control electrode voltage Vg1 in accordance with the beam current Ia only when the beam current Ia is within a predetermined range and to keep the control electrode voltage Vg1 at a fixed value when the beam current Ia falls outside the predetermined range. This manner requires lower withstand voltage for a circuit used to apply a voltage to the control electrode.

[11-4]

Similarly to the above [8-7], the third embodiment of the present invention may be applied to a dynamic-type electron gun to minimize the spot diameter. Also in this case, the control electrode may be separately provided for each color.

Further, apart from the electron gun having the above construction, in the case of an electron gun using magnetic field or the like to form a main lens, a focusing electrode and a final accelerating electrode may be omitted, i.e. the electron gun may be constructed of a cathode, a control electrode, and an accelerating electrode only.

[12] Forth Preferred Embodiment

Next, description is given to a CRT device according to the forth embodiment. The CRT device in this embodiment also has the construction generally similar to that of the CRT device according to the first embodiment. The picture devices of this embodiment differs from the picture devices in the other embodiments in that both the control electrode voltage Vg1 and the accelerating electrode voltage Vg2 are varied at the same time in accordance with the beam current Ia.

Figure 23:
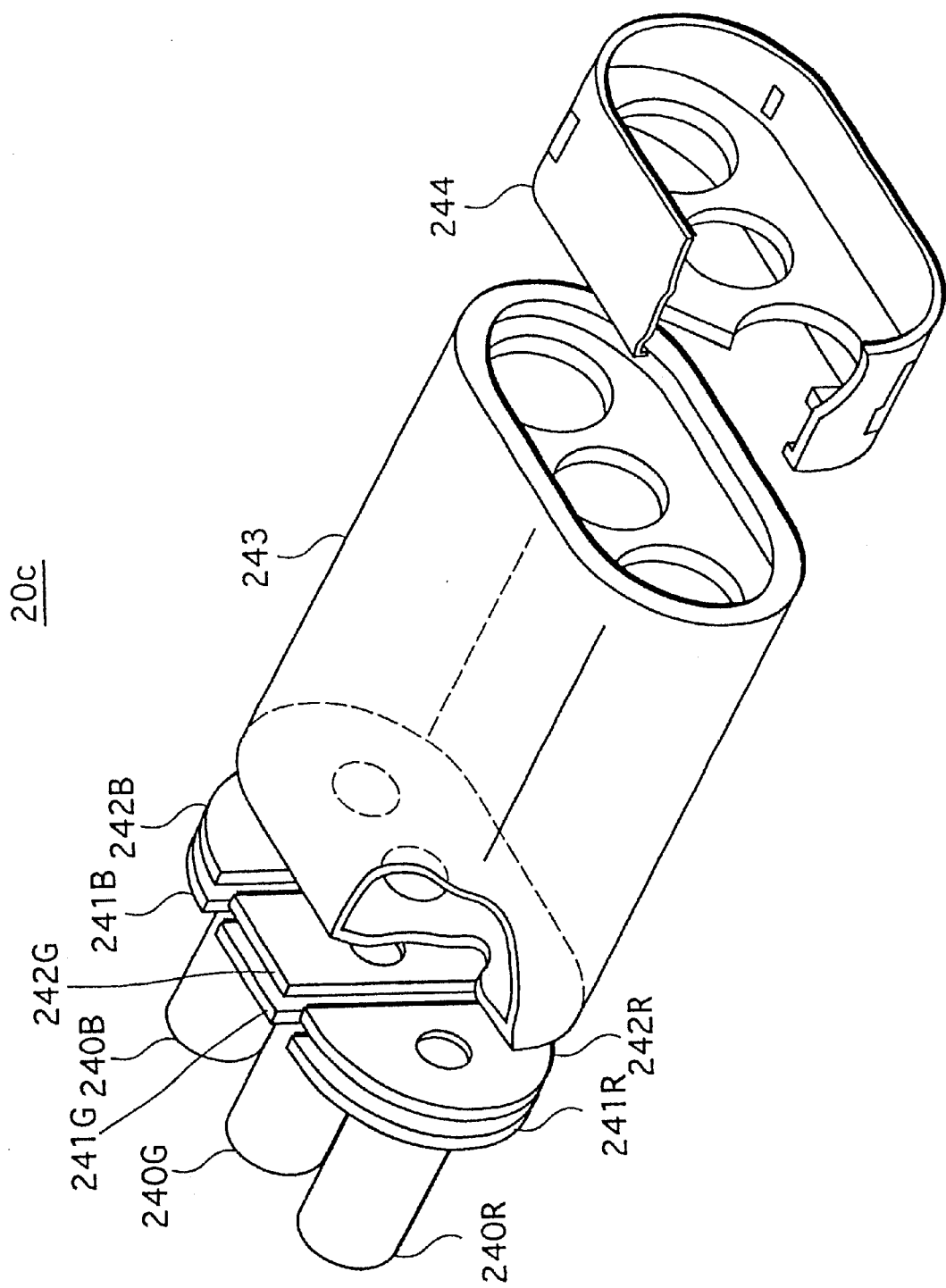
FIG. 23 is an external oblique view showing the construction of an electron gun according to the forth embodiment.

An electron gun included in the CRT device of this embodiment has the construction generally similar to that of the electron gun included in the CRT device of the first embodiment. FIG. 23 is an external oblique view showing the construction of the electron gun according to this embodiment. Unlike the first embodiment (FIG. 3) in which the control electrode 201 is shared among the three colors RGB, in this embodiment (FIG. 23), three control electrodes 241R–241B are provided.

Further, unlike the first embodiment in which the voltage Vg1 applied to the control electrode 201 is kept constant irrespective of the beam current Ia vitiation, in this embodiment, all the voltages applied to the control electrodes 241R–241B and the accelerating electrodes 242R–242B are varied in accordance with the current amount of beam current Ia.

Figure 24:
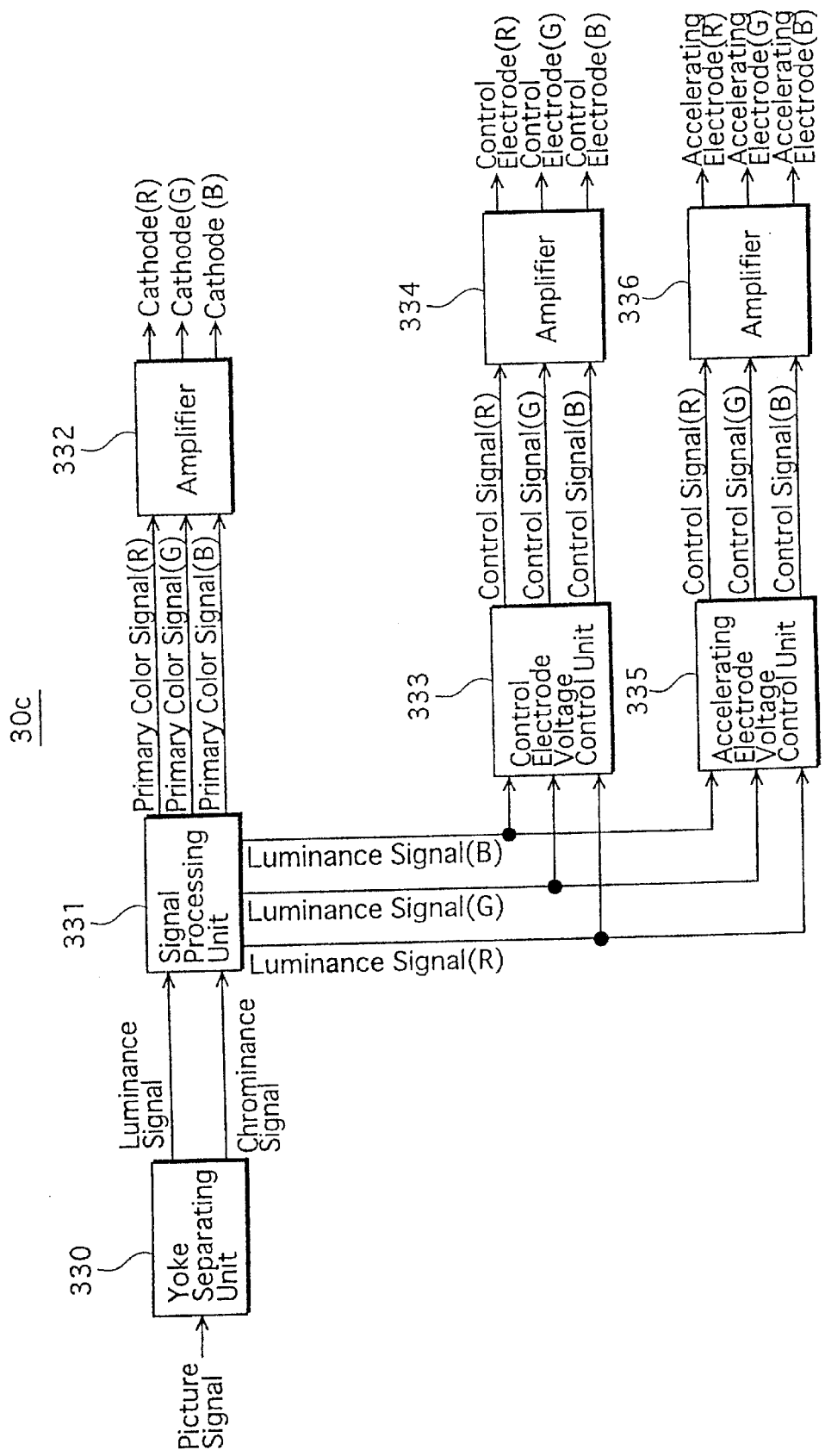
FIG. 24 is an explanatory block diagram showing the construction and function of a control circuit for controlling voltages applied to the control electrodes 231R–231B and to the accelerating electrodes 242R–242B.

FIG. 24 is an explanatory block diagram showing the construction and function of a control circuit for voltages applied to the control electrodes 231R–231B and to the accelerating electrodes 242R–242B. In FIG. 24, the control circuit 30c is constructed of a YC separating unit 330, a signal processing unit 331, a control electrode voltage control unit 333, an accelerating electrode voltage control unit 335, and amplifiers 332, 334, and 336.

The YC separating unit 330 receives picture signals and separate them into luminance signals (Y) and chrominance signals (C) and outputs the separated signals. Upon receipt of the luminance signals (Y) and chrominance signals (C), the signal processing unit 331 conducts processing such as image quality adjustment and outputs primary color signals (R)–(B), and luminance signals (R)–(B). Upon receipt of the primary color signals (R)–(B), the amplifier 322 amplifies the received signals to apply them to the respective cathodes (R)–(B).

The control electrode voltage control unit 333 receives the luminance signals (R)–(B) and outputs control signals (R)–(B) The amplifier 334 amplifies the control signals (R)–(B) to apply voltages to the control electrodes. The accelerating electrode voltage control unit 335 receives the luminance signals (R)–(B) and outputs control signals (R)–(B). The amplifier 336 amplifies the control signals (R)–(B) to apply voltages to the accelerating electrodes.

In the above manner, voltages applied to the control electrodes 231R–231B and the accelerating electrodes 242R–244b are controlled to the values corresponding to the beam current Ia.

Here, the control electrode voltage control unit 333 and the accelerating electrode voltage control unit 335 may have, for example, the construction similar to that of the control electrode voltage control unit 302 described above. In addition, data for the table correlating the luminance signals and the control signals may be determined by actual measurement as in the first embodiment so as to embody the control electrode voltage control unit 333 and the accelerating electrode voltage control unit 335.

Figure 25:
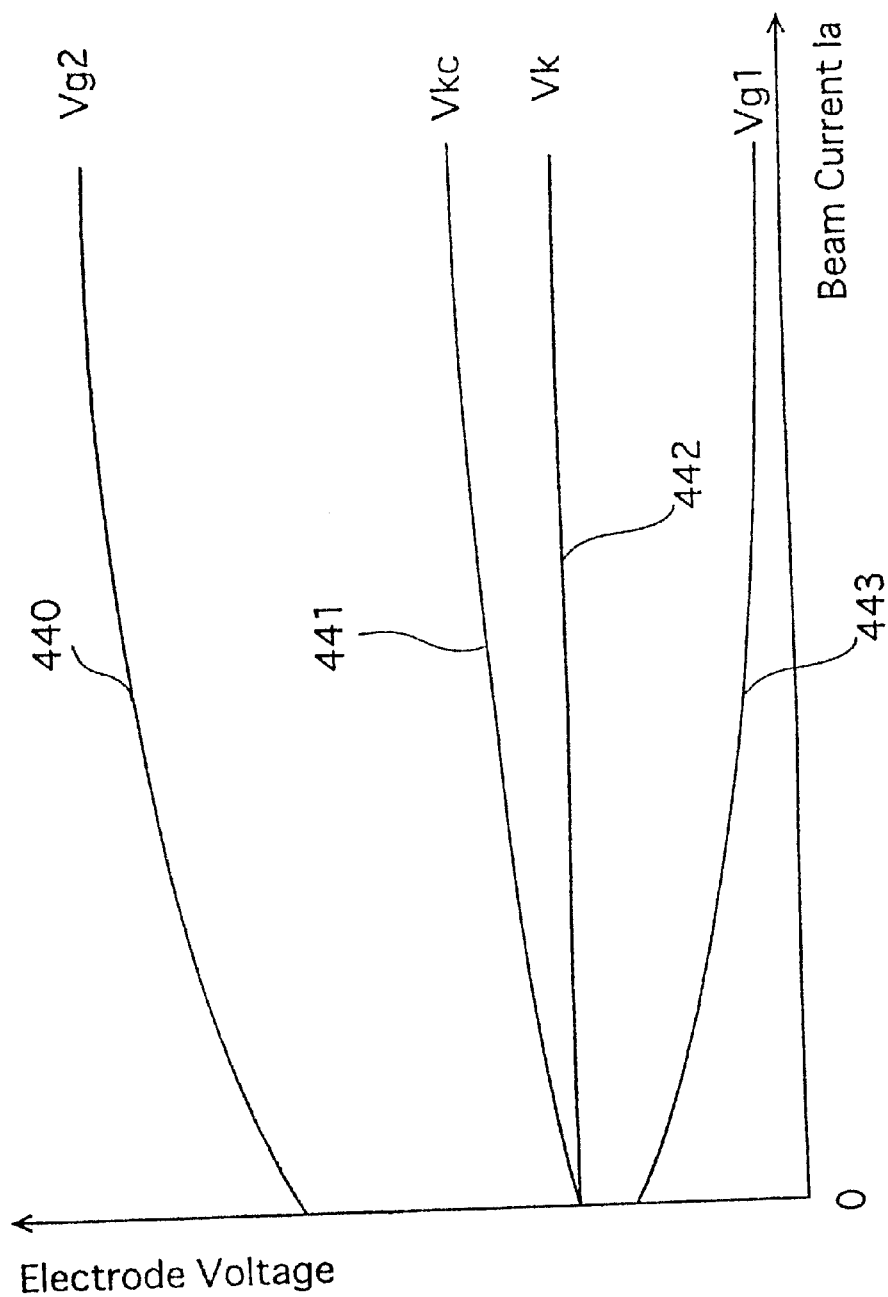
FIG. 25 is a view showing the operation characteristics of the electron gun 20c by way of a graph showing variations in the cathode voltage Vk, the cutoff voltage Vkc, and the control electrode voltage Vg1 and the accelerating electrode voltage Vg2 in relation to the beam current Ia.

Next, description is given to the operation characteristics of an electron gun 20c included in the CRT device according to this embodiment. FIG. 25 is a view showing the operation characteristics of the electron gun 20c by way of a graph showing variations in the cathode voltage Vk, the cutoff voltage Vkc, and the control electrode voltage Vg1 and the accelerating electrode voltage Vg2 in relation to the beam current Ia.

In FIG. 25, solid lines 440–443 represent the accelerating electrode voltage Vg2, the cutoff voltage Vkc, the cathode voltage Vk, and the control electrode voltage Vg1, respectively. As shown in FIG. 25, the control electrode voltage Vg1 drops as the beam current Ia becomes larger, while the accelerating electrode voltage Vg2 rises as the beam current Ia becomes larger.

Through conducting a variable conversion on the above graph in a similar manner to that conducted in the third embodiment, a graph similar to that shown in FIG. 22 is obtained. This means that, similarly to the first embodiment, variation in the cathode lens strength in this embodiment is small irrespective of the beam current Ia variation, so that the spot diameter is minimized irrespective of the luminance.

[13] Modifications of Forth Preferred Embodiment

The forth embodiment may be transformed into various other modifications such as the following.

[13-1]

In the above embodiment, the cathode voltage Vk may be kept constant irrespective of the beam current Ia, or varied in accordance with the luminance signals so as to make the cathode lens appropriate in strength.

[13-2]

Similarly to the above [8-4], the control electrode voltage Vg1 and the accelerating electrode voltage Vg2 in the forth embodiment above may be varied according to the average luminance of a predetermined scope, such as one frame. As a result, production cost of a circuit, such as an amplifier is reduced. Further, instead of the average luminance of the predetermined scope, signals obtained by processing the luminance signals using a low-pass filter may be used to vary the control electrode voltage Vg1 and the accelerating electrode voltage Vg2.

[13-3]

Similarly to the above [8-5], the control electrode voltage Vg1 and the accelerating electrode voltage Vg2 in the forth embodiment above may be made fixed or varied depending on whether the beam current Ia falls within a predetermined range. In this manner, it is allowed that a circuit for controlling the control electrode voltage Vg1 and the like becomes low both in power consumption and manufacturing cost.

[13-4]

Similarly to the above [8-7], the above forth embodiment of the present invention may be applied to a dynamic-type electron gun or to an electron gun without a focusing electrode and a final accelerating electrode and thus constructed of a cathode, a control electrode, and an accelerating electrode only. Each application achieves the effect of the present invention.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A color CRT device, comprising:
   an electron gun including a control electrode and three cathodes, each cathode corresponding to a different color; and
   spot diameter control unit operable to control a spot diameter by varying, for each color, a difference between a cutoff voltage of a corresponding cathode and a voltage applied to the control electrode in accordance with a luminance signal that has the highest luminance level among luminance signals corresponding to the three colors.

2. The color CRT device of claim 1, wherein
   the spot diameter control unit reduces the spot diameter by performing controls so that the difference between the cutoff voltage of each cathode and the voltage applied to the control electrode is greater when the luminance level of the highest-luminance-level luminance signal is higher.

3. The color CRT device of claim 1, wherein
   the spot diameter control unit varies the difference between the cutoff voltage of each cathode and the voltage applied to the control electrode by controlling the voltage applied to control electrode in accordance with the highest-luminance-level luminance signal.

4. The color CRT device of claim 3, wherein
   the spot diameter control unit performs controls so that the voltage applied to the control electrode is lower when the luminance level of the highest-luminance-level luminance signal is higher.

5. The color CRT device of claim 1, wherein
   the electron gun includes an accelerating electrode, and
   the spot diameter control unit varies the difference between the cutoff voltage of each cathode and the voltage applied to the control electrode by controlling both the voltage applied to the control electrode and a voltage applied to the accelerating electrode in accordance with the highest-luminance-level luminance signal.

6. The color CRT device of claim 5, wherein
   the spot diameter control unit performs controls so that the voltage applied to the control electrode is lower and the voltage applied to the accelerating electrode is higher when the luminance level of the highest-luminance-level luminance signal is higher.

7. The color CRT device of claim 1, wherein the electron gun includes an accelerating electrode, and the spot diameter control unit varies the difference between the cutoff voltage of each cathode and the voltage applied to the control electrode by controlling a voltage applied to the accelerating electrode in accordance with the highest-luminance-level luminance signal.

8. The color CRT device of claim 7, the spot diameter control unit performs controls so that the voltage applied to the accelerating electrode is higher when the luminance level of the highest-luminance-level luminance signal is higher.

9. The color CRT device of claim 7, wherein the spot diameter control unit performs controls so that the voltage applied to each cathode is kept constant irrespective of the luminance signals.

10. A color CRT device, comprising:

an electron gun including a control electrode and three cathodes, each cathode corresponding to a different color; and spot diameter controlling unit operable to control a spot diameter by varying, for each color, a difference between a cutoff voltage of a corresponding cathode and a voltage applied to the control electrode in accordance with a luminance signal of the color.

11. The color CRT device of claim 10, wherein the spot diameter control unit reduces the spot diameter by performing controls so that the difference between the cutoff voltage of each cathode and the voltage applied to the control electrode is greater when a luminance level of the corresponding luminance signal is higher.

12. The color CRT device of claim 10, wherein the control electrode is made up of three electrodes, each electrode corresponding to each color, and the spot diameter control unit varies the difference between the cutoff voltage of each cathode and a voltage applied to a corresponding control electrode by controlling the voltage applied to each control electrode in accordance with the corresponding luminance signal.

13. The color CRT device of claim 12, wherein the spot diameter control unit performs controls so that the voltage applied to each control electrode is lower when a luminance level of the corresponding luminance signal is higher.

14. The color CRT device of claim 10, wherein the electron gun includes three accelerating electrodes, each accelerating electrode corresponding to each color, the control electrode is made up of three electrodes, each electrode corresponding to each color, and the spot diameter control unit varies the difference between the cutoff voltage of each cathode and a voltage applied to the corresponding control electrode by controlling both the voltage applied to each control electrode and a voltage applied to a corresponding accelerating electrode in accordance with the corresponding luminance signal.

15. The color CRT device of claim 14, wherein the spot diameter control unit performs controls so that the voltage applied to each control electrode is lower and the voltage applied to the corresponding accelerating electrode is higher when a luminance level of the corresponding luminance signal is higher.

16. The color CRT device of claim 10, wherein the electron gun includes three accelerating electrodes, each accelerating electrode corresponding to each color, and the spot diameter control unit varies the difference between the cutoff voltage of each cathode and the voltage applied to the control electrode by controlling a voltage applied to each accelerating electrode in accordance with the corresponding luminance signal.

17. The color CRT device of claim 16, wherein the spot diameter control unit performs controls so that the voltage applied to each accelerating electrode is higher when a luminance level of the corresponding luminance signal is higher.

18. The color CRT device of claim 16, wherein the spot diameter control unit performs controls so that the voltage applied to each cathode is kept constant irrespective of the corresponding luminance signal.

* * * * *